United States Patent
Ouyang et al.

(10) Patent No.: US 9,841,895 B2
(45) Date of Patent: Dec. 12, 2017

(54) ALTERNATIVE HYPOTHESIS ERROR CORRECTION FOR GESTURE TYPING

(71) Applicant: Google Inc., Mountain View, CA (US)

(72) Inventors: Yu Ouyang, San Jose, CA (US); Shumin Zhai, Los Altos, CA (US)

(73) Assignee: Google LLC, Mountain View, CA (US)

(*) Notice: Subject to any disclaimer, the term of this patent is extended or adjusted under 35 U.S.C. 154(b) by 311 days.

(21) Appl. No.: 14/738,449

(22) Filed: Jun. 12, 2015

(65) Prior Publication Data

US 2015/0277757 A1    Oct. 1, 2015

(51) Int. Cl.
| | |
|---|---|
| G09G 5/00 | (2006.01) |
| G06F 3/0488 | (2013.01) |
| G06F 17/27 | (2006.01) |
| G06F 3/0489 | (2013.01) |
| G06F 3/023 | (2006.01) |

(52) U.S. Cl.
CPC ........ G06F 3/04886 (2013.01); G06F 3/0237 (2013.01); G06F 3/04883 (2013.01); G06F 3/04897 (2013.01); G06F 17/273 (2013.01); G06F 17/276 (2013.01); G06F 3/0236 (2013.01); Y10S 707/99935 (2013.01); Y10S 707/99936 (2013.01)

(58) Field of Classification Search
CPC . G06F 3/0237; G06F 3/04886; G06F 3/04883
USPC ............................ 345/156, 178–179; 715/773
See application file for complete search history.

(56) References Cited

U.S. PATENT DOCUMENTS

| | | |
|---|---|---|
| 4,534,261 A | 8/1985 | Fabrizio |
| 4,833,610 A | 5/1989 | Zamora et al. |
| 4,847,766 A | 7/1989 | McRae et al. |
| 4,988,981 A | 1/1991 | Zimmerman et al. |
| 5,075,896 A | 12/1991 | Wilcox et al. |

(Continued)

FOREIGN PATENT DOCUMENTS

| | | |
|---|---|---|
| CN | 1761989 A | 4/2006 |
| CN | 101390039 A | 3/2009 |

(Continued)

OTHER PUBLICATIONS

International Preliminary Report on Patentability from counterpart International Application No. PCT/US2014/036459, dated Nov. 12, 2015, 9 pp.

(Continued)

*Primary Examiner* — Calvin C Ma
(74) *Attorney, Agent, or Firm* — Shumaker & Sieffert, P.A.

(57) ABSTRACT

In one example, a method may include outputting, by a computing device and for display, a graphical keyboard comprising a plurality of keys, and receiving an indication of a gesture. The method may include determining an alignment score that is based at least in part on a word prefix and an alignment point traversed by the gesture. The method may include determining at least one alternative character that is based at least in part on a misspelling that includes at least a portion of the word prefix. The method may include determining an alternative alignment score based at least in part on the alternative character; and outputting, by the computing device and for display, based at least in part on the alternative alignment score, a candidate word based at least in part on the alternative character.

22 Claims, 10 Drawing Sheets

(56) References Cited

U.S. PATENT DOCUMENTS

| | | |
|---|---|---|
| 5,202,803 A | 4/1993 | Albrecht et al. |
| 5,307,267 A | 4/1994 | Yang |
| 5,319,747 A | 6/1994 | Gerrissen et al. |
| 5,440,070 A | 8/1995 | Okamoto et al. |
| 5,502,803 A | 3/1996 | Yoshida et al. |
| 5,521,986 A | 5/1996 | Curtin et al. |
| 5,593,541 A | 1/1997 | Wong et al. |
| 5,606,494 A | 2/1997 | Oshima et al. |
| 5,677,710 A | 10/1997 | Thompson-Rohrlich |
| 5,684,873 A | 11/1997 | Tiilikainen |
| 5,717,939 A | 2/1998 | Bricklin et al. |
| 5,748,512 A | 5/1998 | Vargas |
| 5,761,689 A | 6/1998 | Rayson et al. |
| 5,765,180 A | 6/1998 | Travis |
| 5,781,179 A | 7/1998 | Nakajima et al. |
| 5,784,504 A | 7/1998 | Anderson et al. |
| 5,805,167 A | 9/1998 | van Cruyningen |
| 5,845,306 A | 12/1998 | Schabes et al. |
| 5,848,187 A | 12/1998 | Bricklin et al. |
| 5,903,229 A | 5/1999 | Kishi |
| 5,905,246 A | 5/1999 | Fajkowski |
| 5,917,493 A | 6/1999 | Tan et al. |
| 5,953,541 A | 9/1999 | King et al. |
| 6,008,799 A | 12/1999 | Van Kleeck |
| 6,032,053 A | 2/2000 | Schroeder et al. |
| 6,041,292 A | 3/2000 | Jochim |
| 6,047,300 A | 4/2000 | Walfish et al. |
| 6,057,845 A | 5/2000 | Dupouy |
| 6,061,050 A | 5/2000 | Allport et al. |
| 6,072,473 A | 6/2000 | Muller et al. |
| 6,094,188 A | 7/2000 | Horton et al. |
| 6,115,482 A | 9/2000 | Sears et al. |
| 6,131,102 A | 10/2000 | Potter |
| 6,150,600 A | 11/2000 | Buchla |
| 6,160,555 A | 12/2000 | Kang et al. |
| 6,278,453 B1 | 8/2001 | Bodnar |
| 6,286,064 B1 | 9/2001 | King et al. |
| 6,292,179 B1 | 9/2001 | Lee |
| 6,310,634 B1 | 10/2001 | Bodnar et al. |
| 6,340,979 B1 | 1/2002 | Beaton et al. |
| RE37,654 E | 4/2002 | Longo |
| 6,396,523 B1 | 5/2002 | Segal et al. |
| 6,407,679 B1 | 6/2002 | Evans et al. |
| 6,417,874 B2 | 7/2002 | Bodnar |
| 6,424,983 B1 | 7/2002 | Schabes et al. |
| 6,438,523 B1 | 8/2002 | Oberteuffer et al. |
| 6,512,838 B1 | 1/2003 | Rafii et al. |
| 6,542,170 B1 | 4/2003 | Williams et al. |
| 6,570,557 B1 | 5/2003 | Westerman et al. |
| 6,573,844 B1 | 6/2003 | Venolia et al. |
| 6,630,924 B1 | 10/2003 | Peck |
| 6,674,895 B2 | 1/2004 | Rafii et al. |
| 6,686,931 B1 | 2/2004 | Bodnar |
| 6,789,231 B1 | 9/2004 | Reynar et al. |
| 6,801,190 B1 | 10/2004 | Robinson |
| 6,983,247 B2 | 1/2006 | Ringger et al. |
| 7,028,259 B1 | 4/2006 | Jacobson |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,170,430 B2 | 1/2007 | Goodgoll |
| 7,199,786 B2 | 4/2007 | Suraqui |
| 7,207,004 B1 | 4/2007 | Harrity |
| 7,231,343 B1 | 6/2007 | Treadgold et al. |
| 7,250,938 B2 * | 7/2007 | Kirkland ............ G06F 3/04883 345/156 |
| 7,269,019 B2 | 9/2007 | Hirata et al. |
| 7,277,088 B2 | 10/2007 | Robinson et al. |
| 7,296,019 B1 | 11/2007 | Chandrasekar et al. |
| 7,336,827 B2 | 2/2008 | Geiger et al. |
| 7,366,983 B2 | 4/2008 | Brill et al. |
| 7,382,358 B2 | 6/2008 | Kushler et al. |
| 7,453,439 B1 | 11/2008 | Kushler et al. |
| 7,479,949 B2 | 1/2009 | Jobs et al. |
| 7,487,461 B2 | 2/2009 | Zhai et al. |
| 7,508,324 B2 | 3/2009 | Suraqui |
| 7,542,029 B2 | 6/2009 | Kushler |
| 7,706,616 B2 | 4/2010 | Kristensson et al. |
| 7,716,579 B2 | 5/2010 | Gunn et al. |
| 7,730,402 B2 | 6/2010 | Song |
| 7,750,891 B2 | 7/2010 | Stephanick et al. |
| 7,809,719 B2 | 10/2010 | Furuuchi et al. |
| 7,831,423 B2 | 11/2010 | Schubert |
| 7,880,730 B2 | 2/2011 | Robinson et al. |
| 7,886,233 B2 | 2/2011 | Rainisto et al. |
| 7,895,518 B2 | 2/2011 | Kristensson |
| 7,907,125 B2 | 3/2011 | Weiss et al. |
| 7,920,132 B2 | 4/2011 | Longe et al. |
| 7,921,361 B2 | 4/2011 | Gunn et al. |
| 7,973,770 B2 | 7/2011 | Tokkonen |
| 8,015,232 B2 * | 9/2011 | Vigil .................... G06F 3/0227 345/173 |
| 8,036,878 B2 | 10/2011 | Assadollahi |
| 8,059,101 B2 | 11/2011 | Westerman et al. |
| 8,135,582 B2 | 3/2012 | Suraqui |
| 8,232,972 B2 | 7/2012 | Huang et al. |
| 8,232,973 B2 | 7/2012 | Kocienda et al. |
| 8,266,528 B1 | 9/2012 | Hayes |
| 8,280,886 B2 | 10/2012 | Labrou et al. |
| 8,359,543 B2 | 1/2013 | Sengupta |
| 8,413,067 B2 | 4/2013 | Cohen et al. |
| 8,438,160 B2 | 5/2013 | Aravamudan et al. |
| 8,514,178 B2 | 8/2013 | Song et al. |
| 8,542,206 B2 | 9/2013 | Westerman et al. |
| 8,552,984 B2 | 10/2013 | Knaven |
| 8,587,542 B2 | 11/2013 | Moore |
| 8,619,048 B2 | 12/2013 | Shimoni |
| 8,667,414 B2 | 3/2014 | Zhai et al. |
| 8,701,032 B1 | 4/2014 | Zhai et al. |
| 8,719,719 B2 | 5/2014 | Cohen et al. |
| 8,782,549 B2 | 7/2014 | Ouyang et al. |
| 8,819,574 B2 | 8/2014 | Ouyang et al. |
| 8,843,845 B2 | 9/2014 | Ouyang et al. |
| 8,850,350 B2 | 9/2014 | Bi et al. |
| 9,021,380 B2 | 4/2015 | Zhai et al. |
| 2002/0013794 A1 | 1/2002 | Carro et al. |
| 2002/0129012 A1 | 9/2002 | Green |
| 2002/0143543 A1 | 10/2002 | Sirivara |
| 2002/0194223 A1 | 12/2002 | Meyers et al. |
| 2003/0006967 A1 | 1/2003 | Pihlaja |
| 2003/0095053 A1 | 5/2003 | Kandogan et al. |
| 2003/0095104 A1 | 5/2003 | Kandogan et al. |
| 2003/0097252 A1 | 5/2003 | Mackie |
| 2003/0165801 A1 | 9/2003 | Levy |
| 2004/0120583 A1 | 6/2004 | Zhai |
| 2004/0140956 A1 | 7/2004 | Kushler et al. |
| 2005/0052406 A1 | 3/2005 | Stephanick et al. |
| 2005/0114115 A1 | 5/2005 | Karidis et al. |
| 2005/0171783 A1 | 8/2005 | Suominen |
| 2005/0190973 A1 | 9/2005 | Kristensson et al. |
| 2006/0004638 A1 | 1/2006 | Royal et al. |
| 2006/0026536 A1 | 2/2006 | Hotelling et al. |
| 2006/0028450 A1 | 2/2006 | Suraqui |
| 2006/0050962 A1 | 3/2006 | Geiger et al. |
| 2006/0053387 A1 | 3/2006 | Ording |
| 2006/0055669 A1 | 3/2006 | Das |
| 2006/0119582 A1 | 6/2006 | Ng et al. |
| 2006/0173674 A1 | 8/2006 | Nakajima et al. |
| 2006/0176283 A1 | 8/2006 | Suraqui |
| 2006/0253793 A1 | 11/2006 | Zhai et al. |
| 2006/0256139 A1 | 11/2006 | Gikandi |
| 2006/0265648 A1 * | 11/2006 | Rainisto ................ G06F 3/0237 715/259 |
| 2007/0016862 A1 | 1/2007 | Kuzmin |
| 2007/0040813 A1 * | 2/2007 | Kushler ................ G06F 3/0237 345/173 |
| 2007/0083276 A1 | 4/2007 | Song |
| 2007/0089070 A1 | 4/2007 | Jaczyk |
| 2007/0094024 A1 | 4/2007 | Kristensson et al. |
| 2007/0152980 A1 | 7/2007 | Kocienda et al. |

(56) References Cited

U.S. PATENT DOCUMENTS

| | | |
|---|---|---|
| 2007/0213983 A1 | 9/2007 | Ramsey |
| 2008/0017722 A1 | 1/2008 | Snyder et al. |
| 2008/0100579 A1 | 5/2008 | Robinson et al. |
| 2008/0122796 A1 | 5/2008 | Jobs et al. |
| 2008/0167858 A1 | 7/2008 | Christie et al. |
| 2008/0172293 A1 | 7/2008 | Raskin et al. |
| 2008/0229255 A1 | 9/2008 | Linjama et al. |
| 2008/0232885 A1 | 9/2008 | Mock et al. |
| 2008/0270896 A1 | 10/2008 | Kristensson |
| 2008/0316183 A1 | 12/2008 | Westerman et al. |
| 2009/0058823 A1 | 3/2009 | Kocienda |
| 2009/0100338 A1 | 4/2009 | Saetti |
| 2009/0119376 A1 | 5/2009 | Bomma |
| 2009/0189864 A1 | 7/2009 | Walker et al. |
| 2010/0021871 A1 | 1/2010 | Layng et al. |
| 2010/0029910 A1 | 2/2010 | Shiba et al. |
| 2010/0070908 A1 | 3/2010 | Mori et al. |
| 2010/0079382 A1 | 4/2010 | Suggs |
| 2010/0125594 A1 | 5/2010 | Li et al. |
| 2010/0131447 A1 | 5/2010 | Creutz et al. |
| 2010/0141484 A1 | 6/2010 | Griffin et al. |
| 2010/0179382 A1 | 7/2010 | Shelton et al. |
| 2010/0199226 A1 | 8/2010 | Nurmi |
| 2010/0235780 A1 | 9/2010 | Westerman et al. |
| 2010/0238125 A1 | 9/2010 | Ronkainen |
| 2010/0257478 A1 | 10/2010 | Longe et al. |
| 2010/0259493 A1 | 10/2010 | Chang et al. |
| 2010/0271299 A1 | 10/2010 | Stephanick et al. |
| 2010/0315266 A1 | 12/2010 | Gunawardana et al. |
| 2011/0061017 A1 | 3/2011 | Ullrich et al. |
| 2011/0063224 A1 | 3/2011 | Vexo et al. |
| 2011/0063231 A1 | 3/2011 | Jakobs et al. |
| 2011/0066984 A1 | 3/2011 | Li |
| 2011/0071834 A1 | 3/2011 | Kristensson et al. |
| 2011/0103682 A1 | 5/2011 | Chidlovskii et al. |
| 2011/0107206 A1 | 5/2011 | Walsh et al. |
| 2011/0119617 A1 | 5/2011 | Kristensson |
| 2011/0122081 A1 | 5/2011 | Kushler |
| 2011/0141027 A1 | 6/2011 | Ghassabian |
| 2011/0141031 A1 | 6/2011 | McCullough et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0193797 A1 | 8/2011 | Unruh |
| 2011/0202834 A1 | 8/2011 | Mandryk et al. |
| 2011/0202836 A1 | 8/2011 | Badger et al. |
| 2011/0205160 A1 | 8/2011 | Song et al. |
| 2011/0208511 A1 | 8/2011 | Sikstrom et al. |
| 2011/0208513 A1 | 8/2011 | Nicks et al. |
| 2011/0209088 A1 | 8/2011 | Hinckley et al. |
| 2011/0210850 A1 | 9/2011 | Tran |
| 2011/0234524 A1 | 9/2011 | Longe et al. |
| 2011/0242000 A1 | 10/2011 | Bi et al. |
| 2011/0254798 A1 | 10/2011 | Adamson et al. |
| 2011/0291940 A1 | 12/2011 | Ghassabian |
| 2012/0011462 A1 | 1/2012 | Westerman et al. |
| 2012/0029910 A1 | 2/2012 | Medlock et al. |
| 2012/0036468 A1 | 2/2012 | Colley |
| 2012/0036469 A1 | 2/2012 | Suraqui |
| 2012/0036485 A1 | 2/2012 | Watkins, Jr. et al. |
| 2012/0046544 A1 | 2/2012 | Inoue |
| 2012/0075190 A1 | 3/2012 | Sengupta |
| 2012/0079412 A1 | 3/2012 | Kocienda et al. |
| 2012/0098846 A1 | 4/2012 | Wun et al. |
| 2012/0113008 A1 | 5/2012 | Makinen et al. |
| 2012/0127080 A1 | 5/2012 | Kushler et al. |
| 2012/0127082 A1 | 5/2012 | Kushler et al. |
| 2012/0131035 A1 | 5/2012 | Yang et al. |
| 2012/0131514 A1 | 5/2012 | Ansell et al. |
| 2012/0162092 A1 | 6/2012 | Pasquero et al. |
| 2012/0166428 A1 | 6/2012 | Kakade et al. |
| 2012/0223889 A1 | 9/2012 | Medlock et al. |
| 2012/0242579 A1 | 9/2012 | Chua |
| 2012/0259615 A1 | 10/2012 | Morin et al. |
| 2012/0274745 A1 | 11/2012 | Russell |
| 2012/0290946 A1 | 11/2012 | Schrock et al. |
| 2012/0310626 A1 | 12/2012 | Kida et al. |
| 2013/0046544 A1 | 2/2013 | Kay et al. |
| 2013/0074014 A1 | 3/2013 | Ouyang et al. |
| 2013/0082824 A1 | 4/2013 | Colley |
| 2013/0120266 A1 | 5/2013 | Griffin et al. |
| 2013/0120430 A1 | 5/2013 | Li et al. |
| 2013/0125034 A1 | 5/2013 | Griffin et al. |
| 2013/0135209 A1 | 5/2013 | Zhai et al. |
| 2013/0176228 A1 | 7/2013 | Griffin et al. |
| 2013/0205242 A1 | 8/2013 | Colby |
| 2013/0212515 A1 | 8/2013 | Eleftheriou |
| 2014/0098023 A1 | 4/2014 | Zhai et al. |
| 2014/0201671 A1 | 7/2014 | Zhai et al. |
| 2014/0327622 A1 | 11/2014 | Ouyang et al. |
| 2014/0344748 A1 | 11/2014 | Ouyang et al. |

FOREIGN PATENT DOCUMENTS

| | | |
|---|---|---|
| CN | 101853126 A | 10/2010 |
| CN | 102411477 A | 4/2012 |
| CN | 102508553 A | 6/2012 |
| CN | 102541304 A | 7/2012 |
| EP | 0844570 A2 | 5/1998 |
| EP | 1603014 A1 | 12/2005 |
| EP | 1860576 | 11/2007 |
| EP | 1887451 | 2/2008 |
| KR | 1020060017743 A | 2/2006 |
| KR | 1020090084818 A | 8/2009 |
| KR | 20100060165 A | 6/2010 |
| KR | 20130001261 A | 1/2013 |
| WO | WO-2004066075 A2 | 8/2004 |
| WO | WO-2007017660 A2 | 2/2007 |
| WO | WO-2008013658 A2 | 1/2008 |
| WO | WO-2011113057 A1 | 9/2011 |
| WO | WO-2013107998 A1 | 7/2013 |

OTHER PUBLICATIONS

"Advanced Tips for Swype," Swype, accessed on Aug. 20, 2012, from www.swype.com/tips/advanced-tips/., 3 pp.

"Dasur Pattern Recognition LTd., Slide Keyboard" User Guide, Jul. 2011, Dasur SlideIT Make it Easy to Write, 21 pp.

"Hey Apple, What the Next iPhone Really, Really Needs is a Much Better Keyboard," by Natasha Lomas, downloaded Apr. 22, 2013, from techcrunch.com/2013/04/21/the-iphone-keyboard-stinks/?, 6 pp.

"How to Type Faster with the Swype Keyboard for Android," How to Geek, accessed on Jun. 4, 2012, from www.howtogeek.com/106643/how-to-type-faster-with-the-swype-keyboard-for-android/, 13 pp.

"Nuance Supercharges Swype, Adds New Keyboard Options, XT9 Predictive Text, and Dragon-Powered Voice Input," accessed on Jun. 20, 2012, from http:l/techcrunch.com/2012/06/20/nuance-supercharges-swype-adds-new-keyboard-options-xt9-predictive-text-and-dragon-powered-voice-input/, 2 pp.

"Permissions," Keymonk Keyboard Free—Android Apps on Google Play, accessed on Oct. 3, 2012 from https://play.google.com/store/apps/details?id=com.keymonk.latin&hl=en, 2 pp.

"ShapeWriter Keyboard allows you to input on Android the same experience with on PC," Talk Android, accessed on Oct. 25, 2009, from talkandroid.com/.../2767-shapewriter-keyboard-allows-you-input-android-same-experience-pc.html, 3 pp.

"ShapeWriter vs. Swype Keyboard," DroidForums.net, accessed on Jun. 1, 2010, from www.droidforums.net/forum/droid-applications/48707-shapewriter-vs-swype-keyboard.html, 5 pp.

"SlideiT Soft Keyboard," SlideiT, accessed on Jan. 31, 2012, from https://market.android.com/details?id=com.dasur.slideit.vt.life&feature, 4 pp.

"SwiftKey 3 Keyboard—Android Apps on Google Play," accessed on Nov. 27, 2012, from atweb.archive.org/web/20121127141326/hllps://play.2google.com/store/apps/details?id=com.touchtype.swiftkey&hl=en, 3 pp.

(56) References Cited

OTHER PUBLICATIONS

"SwiftKey 3 Keyboard—Android Apps on Google Play," accessed on Oct. 20, 2012, from atweb.archive.org/web/20121020153209/hllps://playgoogle.com/store/apps/details?id=com.touchtype. swiftkey&hl=en, 4 pp.

"SwiftKey Counters Swipe with a Smart Version, Makes an In-Road Into Healthcare Market" by Mike Butcher, found at http:l/techcrunch. com/20 12/06/21/swiftkey-counters-swype-with-a-smarter -version-makes-an-in-road-into-healthcare- market/, Jun. 21, 2012, 1 p.

"Swipe Nuance Home, Type Fast, Swipe Faster," found at hllp://www.swipe.com/, accessed on May 25, 2012, 1 p.

"Swype Basics," Swype.com, accessed on Jun. 8, 2012, from www.swype.com/lips/swype-basics/, 2 pp.

"Text Chat," Sensory Software International Ltd., accessed on Jun. 4, 2012, from www.sensorysoftware.com/textchat.html, 3 pp.

"The Future of Smartphone Keyboards," Keymonk, accessed on Sep. 5, 2012, from www.keymonk.com, 2 pp.

"TouchPal v1.0 for Android will Release Soon!," Welcome to CooTek—TouchPal, an innovative soft keyboard, accessed on Aug. 20, 2012 from www.cootek.com/intro-android.aspx, 2 pp.

"User Reviews," Keymonk Keyboard Free—Android Apps on Google Play, accessed on Oct. 3, 2012, from https://play.google.com/store/apps/detail?id=com.keymonk.latin&hl=en, 2 pp.

"What's New," Keymonk Keyboard Free—Android Apps on Google Play, accessed on Oct. 3, 2012, from https://play.google.com/store/apps/detail?id=com.keymonk.latin&hl=en, 2 pp.

Accot et al., "Refining Fitts' Law Models for Bivariate Pointing," IBM Almaden Research Center, Paper: Pointing and Manipulating, Apr. 5-10, 2003, pp. 193-200.

Alkanhal et al., "Automatic Stochastic Arabic Spelling Correction With Emphasis on Space Insertions and Deletions," IEEE Transactions on Audio, Speech and Language Processing, IEEE Service Center, vol. 20, No. 7, Jun. 11, 2012, 6 pages.

Android OS, Language & Keyboard settings, found at support.google.com/ics.nexus/bin/answer.py?hl+en&Answer=168584, downloaded Jun. 4, 2012, 3 pp.

Bellegarda, Statistical Language Model Adaptation: Review and Perspectives, Speech Communication 42, Jan. 2004, pp. 93-108.

Bryant, "Why your typing sucks on Android, and how to fix it," Mar. 3, 2010, retrieved on thenextweb.com/mobile/2010/03/03/typing-sucks-android-fix/, 3 pp.

Eye, "Split Keyboard for iPad [Concept]," Apr. 23, 2010, retrieved from http:www.redmondpipe.com/split-keyboard-for-ipad-9140675/, 6 pp.

Goodman et al., Language Modeling for Soft Keyboards, Proceedings of the 7th International Conference on Intelligent user interfaces, Jan. 13-16, 2002, pp. 194-195.

Goodman, "A Bit of Progress in Language Modeling Extended Version," Machine Learning and Applied Statistics Group, Microsoft Corporation, Aug. 2001, 73 pp.

Gunawardana et al., "Usability Guided Key-Target Resizing for Soft Keyboards," Proceedings of the 15th International Conference on Intelligent user interfaces, Feb. 7-10, 2010, pp. 111-118.

Harb et al., "Back-off Language Model Compression," Google Inc., 2009, 4 pp.

International Search Report and Written Opinion from International Application No. PCT/US2014/036459, dated Aug. 22, 2014, 11 pp.

Kane et al., "TrueKeys: Identifying and Correcting Typing Errors for People with Motor Impairments," Proceedings of the 13th International Conference on Intelligent User Interfaces, 1UI '08, Jan. 13, 2008, 4 pp.

Karch, "Typing, Copy, and Search," Android Tablets Made Simple, Nov. 18, 2011, 13 pp.

Keymonk Keyboard Free—Android Apps on Google Play, Description, found at hllps:1/play.google.com/slore/apps/ delails?id=com.keymonk.lalin&hl=en, downloaded Oct. 3, 2012, 2 pp.

Kristensson et al,. "Shark2: A Large Vocabulary Shorthand Writing System for Pen-based Computers," UIST, vol. 6, issue 2, Oct. 24-27, 2004.

Kristensson et al., "Command Strokes with and without Preview: Using Pen Gestures on Keyboard for Command Selection," CHI Proceedings, San Jose, CA, USA, Apr. 28-May 3, 2007, 10 pp.

Kristensson et al., "Relaxing Stylus Typing Precision by Geometric Pattern Matching," Proceedings of the 1oth International Conference on Intelligent User Interfaces, Jan. 9-12, 2005, pp. 151-158.

Landau, "Avoid iPhone navigation and typing hassles," Dec. 28, 2007, found at www.macworld.com/article/1131264/lco_iphone .him I, 9 pp.

Li, "Protract: A Fast and Accurate Gesture Recognizer," Apr. 10-15, 2010, pp. 2169-2172.

MacKenzie et al., "LetterWise: Prefix-based Disambiguation for Mobile Text Input," Proceedings of the 14th Annual ACM Symposium on User Interface Software and Technology, Nov. 11-14, 2001, pp. 111-120.

Mohri et al., "Speech Recognition With Weighted Finite-State Transducers," Springer Handbook on Speech Processing and Speech Communication, 2008, 31 pp.

Naseem, "A Hybrid Approach for Urdu Spell Checking," MS Thesis, National University of Computer & Emerging Sciences, retrieved from the internet http://www.cle.org.pk!Publication/theses/2004/a_hybrid_approach_for_Urdu_spell_checking.pdf, Nov. 1, 2004, 87 pp.

Purcell, "Split Keyboard for Thumb Typing Coming to iPad with iOS 5," Jun. 6, 2011, retrieved from http://www.gottabemobile.com/2011/06/06/split-keyboard-for-thumb-typing-coming-to-ipad-with-ios-5, 8 pp.

Rhee, "7 Swype keyboard tips for better Swyping," CNET How to, accessed on Jun. 14, 2011, from http://howto.cnel.com/8301-11310_39-20070627-285/7-swype-keyboard-lips-for-better-swyping/, 5 pp.

Rybach et al., "Silence is Golden: Modeling Non-speech Events in West-Based Dynamic Network Decoders," Human Language Technology and Pattern Recognition, Computer Science Department RWTH Aachen University, Mar. 2012, 4pp.

ShapeWriter Research Project home page, accessed May 25, 2012, found at http://www.almaden.ibm.com/u/zhai/ shapewriter_research.htm, 12 pp.

Tappert et al., "The State of the Art in On-Line Handwriting Recognition," IEEE Transactions on Pattern Analysis and Machine Intelligence, val. 12, No. 8, Aug. 1990, pp. 787-808.

Williamson et al., "Hex: Dynamics and Probabilistic Text Entry," Switching and Learning LNCS 3355, pp. 333-342, 2005.

Wobbrock et al., "$1 Unistroke Recognizer in JavaScript," [online], first accessed on Jan. 24, 2012, retrieved from the Internet: hllp://depts.washington.edu/aimgroup/proj/dollar/>, 2 pp.

Wobbrock et al., "Gestures without Libraries, Toolkits or Training: A $1 Recognizer for User Inter face Prototypes," UIST 2007, Proceedings of the 2oth Annual ACM Symposium on User Interface Software and Technology, Aug. 19, 2007, pp. 159-168.

Young et al., "Token Passing: a Simple Conceptual Model for Connected Speech Recognition Systems," Cambridge University Engineering Department, Jul. 31, 1989, 23 pp.

Youtube, "Automatic error correction on graphical keyboard," Retrieved from http://www.youtube.com/watch? v=_VgYrz7Pi60, Uploaded on Jun. 14, 2007, 1 p.

Youtube, "BiindType—Demo 1,"Retrieved from http://www.youtube.com/watch?v=M968NIMd79w, Uploaded on Jul. 17, 2010, 1 p.

Youtube, "BiindType—Demo 2," Retrieved from http://www.youtube.com/watch?v=7gDF4oclhQM, Uploaded on Augus 2, 2010, 1 p.

Youtube, "BiindType on Android," Retrieved from http://www.youtube.com/watch?v=m6eKm1gUnTE, Uploaded on Aug. 7, 2010, 1 p.

Youtube, "BiindType—Thank you!," Retrieved from http://www.youtube.com/watch?v=KTw4JexFW-o, Uploaded on Jul. 22, 2010, 1 p.

Zhai et al., "In search of effective text input interfaces for off the desktop computing," Interacting with Computers 17, Feb. 20, 2004, pp. 229-250.

Zhai, Shumin, "Text input for future computing devices (SHARK shorthand and ATOMIK)," SHARK Shorthand [online]. Apr. 23,

(56) References Cited

OTHER PUBLICATIONS

2012. First Accessed on Jan. 31, 2014. Retrieved from the Internet: <hllps:l/web.archive.org/web/20120423013658/http://www.almaden.ibm.com/u/zhai/topics/virtualkeyboard.htm>, 3 pp.
Prosecution History from U.S. Appl. No. 13/907,614, from Sep. 6, 2013 through Mar. 11, 2015, 115 pp.
Response to the Examination Report dated Jun. 28, 2016, from counterpart Australian Application No. 2014259754, filed Aug. 2, 2016, 18 pp.
Notice of Acceptance from counterpart Australian Application No. 2014259754, dated Aug. 9, 2016, 2 pp.
Office Action and Examination Report, and translation thereof, from counterpart Korean Application No. 10-2015-7033499, dated Nov. 17, 2016, 12 pp.
Office Action from counterpart Canadian Application No. 2,910,413 dated Nov. 7, 2016, 3 pp.
Response to Canadian Office Action dated Nov. 7, 2016, from counterpart Canadian application No. 2,910,413, filed May 3, 2017, 11 pp.
Patent Examination Report No. 1 from Australian application No. 2014259754, dated Jun. 28, 2016 5 pgs.
First Office Action and Search Report, and translation thereof, from counterpart Chinese Application No. 201480038018.9, dated Jun. 26, 2017, 18 pp.

\* cited by examiner

ALTERNATIVE HYPOTHESIS ERROR CORRECTION FOR GESTURE TYPING

CROSS-REFERENCE TO RELATED APPLICATIONS

This application is a continuation of U.S. application Ser. No. 13/907,614, filed May 31, 2013, which claims the benefit of U.S. Provisional Application No. 61/819,363, filed May 3, 2013, which are hereby expressly incorporated by reference herein.

BACKGROUND

Some computing devices (e.g., mobile phones, tablet computers, etc.) provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a continuous-gesture graphical keyboard (sometimes referred to as a "gesture keyboard" or "combo gesture keyboard") with which a user can interact by sliding his or her finger over regions of the presence-sensitive display that are associated with keys of the graphical keyboard, thereby essentially gesturing a word to be input to the computing device. In other words, the user may input an entire word in a single gesture by tracing over the letters of the word output at a presence-sensitive display. In this way, continuous-gesture graphical keyboards provide an input method that allows the user to enter a word or group of words with a gesture. As such, a continuous-gesture graphical keyboard may allow the user to achieve a certain degree of efficiency, especially compared to one-handed tapping of a presence-sensitive screen (e.g., a presence-sensitive screen operatively coupled to or integrated with a computing device).

In some examples, a computing device that provides a gesture keyboard may rely on word prediction, auto-correction, and/or suggestion techniques for determining a word from a gesture input. These techniques may speed up text entry and minimize spelling mistakes of in-vocabulary character strings (e.g., words in a dictionary). However, one or more of the techniques may have certain drawbacks. For instance, in some examples, a computing device that provides a gesture keyboard and relies on one or more of the techniques may not correctly determine the word intended by a user based upon the gesture input entered at the presence-sensitive screen. As such, a user may need to perform additional effort to enter words using a gesture input.

SUMMARY

In one example, a method may include outputting, by a computing device and for display, a graphical keyboard comprising a plurality of keys. The method may include receiving, by the computing device, an indication of a gesture detected at a presence-sensitive input device. The method may include determining, by the computing device, an alignment score that is based at least in part on a word prefix and an alignment point traversed by the gesture, wherein the alignment score represents a probability that the alignment point indicates a key of the plurality of keys. The method may include determining, by the computing device, at least one alternative character that is based at least in part on a misspelling that includes at least a portion of the word prefix. The method may include determining, by the computing device, an alternative alignment score that is based at least in part on the alternative character. The method may include outputting, by the computing device for display, and based at least in part on the alternative alignment score, a candidate word.

In one example, a computer-readable storage medium may be encoded with instructions that, when executed, cause at least one processor to: output for display, a graphical keyboard comprising a plurality of keys. The computer-readable storage medium may be encoded with instructions that, when executed, cause at least one processor to: receive an indication of a gesture detected at a presence-sensitive input device. The computer-readable storage medium may be encoded with instructions that, when executed, cause at least one processor to determine an alignment score that is based at least in part on a word prefix and an alignment point traversed by the gesture, wherein the alignment score represents a probability that the alignment point indicates a key of the plurality of keys. The computer-readable storage medium may be encoded with instructions that, when executed, cause at least one processor to determine at least one alternative character that is based at least in part on a misspelling that includes at least a portion of the word prefix. The computer-readable storage medium may be encoded with instructions that, when executed, cause at least one processor to determine an alternative alignment score that is based at least in part on the alternative character. The computer-readable storage medium may be encoded with instructions that, when executed, cause at least one processor to output for display, and based at least in part on the alternative alignment score, a candidate word based at least in part on the alternative character.

In one example, a computing device may include at least one processor, wherein the at least one processor is configured to output for display a graphical keyboard comprising a plurality of keys. The at least one processor may be configured to receive an indication of a gesture detected at a presence-sensitive input device. The at least one processor may be configured to determine an alignment score that is based at least in part on a word prefix and an alignment point traversed by the gesture, wherein the alignment score represents a probability that the alignment point indicates a key of the plurality of keys. The at least one processor may be configured to, responsive to determining that the alignment score fails to satisfy a threshold, determining, by the computing device, at least one alternative word prefix. The at least one processor may be configured to determine an alternative alignment score that is based at least in part on the at least one alternative word prefix. The at least one processor may be configured to output for display, and based at least in part on the alternative alignment score, a candidate word.

The details of one or more examples are set forth in the accompanying drawings and the description below. Other features, objects, and advantages of the disclosure will be apparent from the description and drawings, and from the claims.

DETAILED DESCRIPTION

Figure 1:
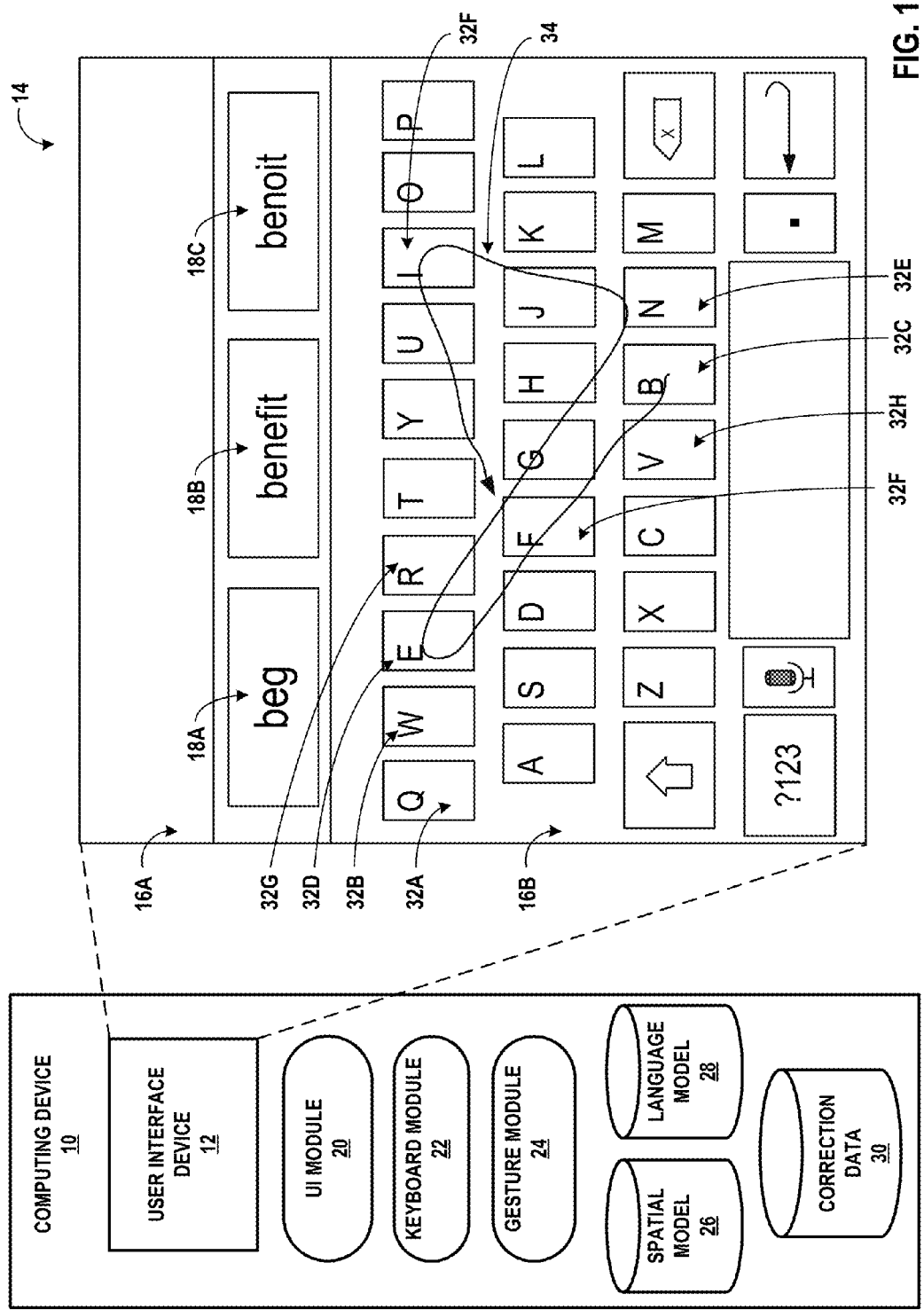
FIG. 1 is a conceptual diagram illustrating an example computing device that is used to perform error correction of input using gesture-based input, in accordance with techniques of the disclosure.

In general, this disclosure is directed to techniques for character string determination and prediction in response to erroneous gesture-based input, in accordance with techniques of the disclosure. In some examples, a computing device that outputs a graphical keyboard for display may receive indications of gestures detected at the presence-sensitive screen. For instance, a continuous (e.g., non-tap) gesture that traverses locations of a presence-sensitive screen associated with multiple keys of the graphical keyboard may indicate a selection of one or more of the keys. In certain examples, the computing device may receive input associated with one or more gestures at or near the presence-sensitive screen that is indicative of one or more character strings that include one or more characters. Such character strings may be included in a lexicon (e.g., words of a dictionary) and represent a word in a vocabulary of a language or a portion of the word in the vocabulary. In such examples, the gesture may traverse group of keys that correspond to the characters included in the character string.

In some examples, the gesture may not traverse through a group of keys that respectively corresponds to a character string that is included in a lexicon. In other words, the user may have provided an erroneous continuous gesture that does not correspond to keys that represent a character string intended as input by the user. For instance, a user may erroneously perform a continuous gesture that traverses the keys T-R-U-E-L-Y of the graphical keyboard although the user desired to input the character string "truly." Rather than only outputting "tiredly" or some other word which the user did not intend to enter, techniques of the disclosure may generate at least one alternative hypothesis that is based upon an autocorrected spelling of the character string "truly" that, in this example, the user intended.

The techniques described in this disclosure may improve the accuracy with which a computing device determines a candidate word using auto-correction in response to an erroneous selection of keys. In some examples, techniques of the disclosure may improve the accuracy of word predictions for a variety of types of spelling errors, including but not limited to: substitution errors ("cemetary"→"cemetery"), deletion errors ("Farenheit"→"Fahrenheit"), insertion errors ("truely"→"truly"), and transposition errors ("wierd"→"weird"). For instance, a computing device implementing techniques of the disclosure may incrementally determine different groups of keys of the graphical keyboard that are traversed by the gesture path of a gesture. The incremental determinations may include searching for one or more points of a gesture that align with a given keyboard position of a key that corresponds to a given letter. Each different group of keys may correspond to a respective group of characters that, collectively, represents a character string. Each character string may be a hypothesis, for example, a prefix of one or more words included in a lexicon.

Using techniques of the disclosure, a computing device may determine alternative hypotheses, e.g., prefixes of one or more words that include characters based on misspellings of characters, combinations of characters, and/or words in a lexicon. That is, if a gesture path is not well-aligned to one or more keys that correspond to a word in the lexicon (e.g., the user erroneously gestured an incorrect spelling of an intended word), the computing device may determine alternative hypotheses based on the misspellings. The alternative hypotheses that indicate higher probabilities for certain words in the lexicon that include the characters of the alternative hypotheses. Techniques of the disclosure may therefore relax constraints on continuous gesture input that would otherwise require a gesture path to match every key corresponding to every character of an intended word. Consequently, a computing device implementing techniques of the disclosure may more accurately output words the user intended.

FIG. 1 is a conceptual diagram illustrating an example computing device that is used to perform error correction of input using gesture-based input, in accordance with techniques of the disclosure. In the example of FIG. 1, computing device 10 may be a mobile phone. However, in other examples, computing device 10 may be a tablet computer, a personal digital assistant (PDA), a laptop computer, a portable gaming device, a portable media player, an e-book reader, a watch, television platform, or another type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as a presence-sensitive input device using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen that may receive tactile user input from a user of computing device 10. UID 12 may receive indications of the tactile user input by detecting one or more tap and/or non-tap gestures from a user of computing device 10 (e.g., the user touching or pointing to one or more locations of UID 12 with a finger or a stylus pen). The presence-sensitive screen of UID 12 may present output to a user. UID 12 may present the output as a user interface (e.g., user interface 14) which may be related to functionality provided by computing device 10. For example, UID 12 may present various user interfaces of applications (e.g., an electronic message application, an Internet browser application, etc.) executing at computing device 10. A user of computing device 10 may interact with one or more of these applications to perform a function with computing device 10 through the respective user interface of each application.

Computing device 10 may include user interface ("UI") module 20, keyboard module 22, and gesture module 24. Modules 20, 22, and 24 may perform operations described using software, hardware, firmware, or a mixture of both hardware, software, and firmware residing in and executing on computing device 10. Computing device 10 may execute modules 20, 22, and 24, with multiple processors. Computing device 10 may execute modules 20, 22, and 24 as a virtual machine executing on underlying hardware. Modules 20, 22, and 24 may be implemented in various ways. For example, UI module 20 may be implemented as a downloadable or pre-installed application or "app." In another example, UI module 20 may be implemented as part of an operating system of computing device 10.

Gesture module 24 of computing device 10 may receive from UID 12, one or more indications of user input detected at the presence-sensitive screen of UID 12. Generally, each time UID 12 receives an indication of user input detected at a location of the presence-sensitive screen, gesture module 24 may receive information about the user input from UID 12. Gesture module 24 may assemble the information received from UID 12 into a time-ordered set of events indicative of a gesture, such as a sequence of touch events. Each touch event in the sequence may include data or components that represents parameters (e.g., when, where, originating direction) characterizing a presence and/or movement of input at the presence-sensitive screen. Each touch event in the sequence may include a location component corresponding to a location of UID 12, a time component related to when UID 12 detected user input at the location, and an action component related to whether the touch event corresponds to a lift up or a push down at the location. Moreover, one or more of the events may have a concurrent time component, and such events are described as touch events merely for purposes of example and may be indicative of a gesture at any form of presence-sensitive input device.

Gesture module 24 may determine one or more characteristics of the user input based on the sequence of touch events and include information about these one or more characteristics within each touch event in the sequence of touch events. For example, gesture module 24 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). In some examples, gesture module 24 determines one or more locations of UID 12 that are touched or otherwise detected in response to a user gesture, based on information received from UI module 20. In some examples, gesture module 24 can determine one or more features associated with a gesture, such as the Euclidean distance between two alignment points, the length of a gesture path, the direction of a gesture, the curvature of a gesture path, the shape of the gesture, and maximum curvature of a gesture between alignment points, speed of the gesture, etc. As one example, a determination to consider a misspelling could depend on a factor like speed (hesitation may indicate more uncertainty) or the likelihood of the specific spelling correction based on the letters affected ('e' to 'i' is a common misspelling, 'e' to 'z' is possibly less common). Gesture module 24 may transmit, as data to keyboard module 22, the sequence of touch events including the components or parameterized data associated with each touch event.

In the example of FIG. 1, UI module 20 may cause UID 12 to present example user interface 14. In this example, user interface 14 includes graphical elements displayed at various locations of UID 12. FIG. 1 illustrates edit region 16A of user interface 14, and graphical keyboard 16B of user interface 14. Edit region 16A may include graphical elements such as images, objects, hyperlinks, characters of text, etc. Graphical keyboard 16B includes graphical elements displayed as keys. User interface 14 includes suggested character string regions 18A-18C that include selectable spelling corrections or character string suggestions to replace character strings that are included in edit region 16A. In the example of FIG. 1, edit region 16A may include graphical elements displayed as characters of text (e.g., a character string). A user of computing device 10 may enter text in edit region 16A by providing user input at locations of UID 12 that display the keys of graphical keyboard 16B. In response to user input such as this, computing device 10 may output one or more suggested character strings in suggested character string regions 18A-18C.

UI module 20 may act as an intermediary between various components of computing device 10 to make determinations based on input detected by UID 12 and generate output presented by UID 12. For instance, UI module 20 may receive, as an input from keyboard module 22, a representation of a keyboard layout of the keys included in graphical keyboard 16B. UI module 20 may send indications of user input to gesture module 24, which may generate a sequence of touch events generated from information about user input detected by UID 12. Keyboard module 22, upon receiving touch events from gesture module 24 may determine, based on the location components in the sequence touch events, that one or more location components approximate a selection of one or more keys. In response, UI module 20 may receive, from keyboard module 22, one or more suggested character strings. UI module 20 may update user interface 14 to include the one or more character strings within edit region 16A and/or character string regions 18A-18C. UI module 20 may cause UID 12 to present the updated user interface 14.

Keyboard module 22 of computing device 10 may transmit, as data to UI module 20 (for inclusion as graphical keyboard 16B of user interface 14) a keyboard layout including a plurality of keys related to one or more written languages (e.g., English, Spanish, etc.). Keyboard module 22 may assign one or more characters or operations to each key of the plurality of keys in the keyboard layout. For instance, keyboard module 22 may generate a QWERTY keyboard layout including keys that represent characters used in typing the English language. The QWERTY keyboard layout may also include keys that represent operations used in typing the English language (e.g., backspace, delete, spacebar, enter, etc.). Graphical keyboard 16B may include a plurality of keys, such as "Q" key 32A, "W" key 32B, etc. In some examples, each of the plurality of keys included in graphical keyboard 16 represents a single character. In other examples, one or more of the plurality of keys included in graphical keyboard 16 represents a group of characters selected based on a plurality of modes.

Computing device 10 may include one or more spatial models, such as spatial model 26, to incrementally determine different selections of one or more keys based on a sequence of touch events. In general, spatial model 26 may generate one or more probabilities that a particular key of a graphical keyboard has been selected based on location data associated with a user input. In some examples, spatial model 26 includes a bivariate Gaussian model for each key. The bivariate Gaussian model for a key may include a distribution of coordinates (e.g., (x,y) coordinate pairs) that correspond to locations of UID 12 that present the given key. More specifically, in some examples, a bivariate Gaussian model for a key may include a distribution of coordinates that correspond to locations of UID 12 that are most frequently selected by a user when the user intends to select the given key. The shorter the distance between location data of a user input and a higher density area of spatial model 26, the higher the probability that the key associated with spatial model 26 has been selected. A greater distance between location data of a user input and a higher density area of spatial model 26, the lower the probability that the key associated with spatial model 26 has been selected.

Keyboard module 22 may use spatial model 26 to compare the location components (e.g., coordinates) of one or more touch events in the sequence of touch events to respective locations of one or more keys of graphical keyboard 16B and generate a probability based on these comparisons that a selection of a key occurred. In some examples, keyboard module 22 may generate a spatial score using spatial model 26. The spatial score may indicate a probability of a selected key based at least in part on locations of UID 12 traversed by a gesture. In some examples, a spatial score may indicate a combined probability of a group of selected keys based at least in part on locations of UID 12 traversed by a gesture.

For example, keyboard module 22 may use spatial model 26 to compare the location component of one or more touch event in the sequence of touch events to a key location of a particular key of graphical keyboard 16B. The location component of each touch event in the sequence may include one location of UID 12. A key location (e.g., a centroid of a key) of a key in graphical keyboard 16B may include a different location of UID 12. Keyboard module 22 may use spatial model 26 to determine a Euclidian distance between the two locations and generate a probability based on the Euclidian distance that the key was selected. Spatial model 26 may indicate a higher probability for a key that shares a smaller Euclidian distance with one or more touch events than a key that shares a greater Euclidian distance with one or more touch events. Based on the spatial model probability associated with each key, keyboard module 22 may assemble the individual key selections with the highest spatial model probabilities into a time-ordered sequence of keys that keyboard module 22 may then determine represents a character string. The combined probabilities of each key may represent a spatial score for the character string.

Computing device 10, in some examples, includes language model 28. Language model 28 may include a lexicon. In some examples, a lexicon may include a listing of words and may include additional information about the listed words. A lexicon may be represented by one or more data structures, such as by one or more of an array, a list, a tree, or other data structures. For example, language model 28 may include a lexicon stored in a trie data structure. A lexicon trie data structure may include a plurality of nodes. Each node of the lexicon trie may represent a letter. The first node in a lexicon trie may be considered an entry node, which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word) included in the lexicon. The letters indicated by the nodes along a path of nodes from the entry node to a terminal node may spell out a word indicated by the terminal node. In some examples, language model 28 may be based on a default dictionary installed on computing device 10. In certain examples, language model 28 may include a group of predefined phrases installed on computing device 10. In other examples, language model 28 may include multiple sources of lexicons, which may be stored at computing device 2 or stored at one or more remote computing devices that are accessible to computing device 2 via one or more communication channels.

In some examples, language model 28 may be implemented in the firmware of computing device 10. Language model 28 may include language model frequency information such as n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "w" follows the sequence of letters "no". As another example, a trigram language model (an n-gram model where n=3) may provide a probability that the word "to" follows the sequence of words "we aim". In certain examples, a trigram language model may provide a probability that a delimiter character (e.g., a comma delimiter character, a period delimiter character, a semicolon delimiter character) is positioned between a first character string and a second character string. For instance, a trigram language model may provide a probability that a comma delimiter character is positioned between a first character string "example" and a second character string "the." In some examples, language model 28 includes a lexicon trie with integrated language model frequency information. For instance, each node of the lexicon trie may include a representation of a letter and a probability value.

Keyboard module 22 may access language model 28 of computing device 10 to incrementally determine language scores for a group of one or more character strings based on sequences of keys corresponding to a gesture. The character strings may be prefixes of words modeled in language model 28. As keyboard module 22 receives indications of one or more gestures, keyboard module 22 may incrementally determine spatial and language scores corresponding to the prefixes. Using the spatial and language scores, keyboard module 22 may determine a combined score (e.g., an alignment score) for each character string based on the spatial and language score for each respective character string. Keyboard module 22 may update the spatial, language, and/or alignment scores incrementally as keyboard module 22 determines subsequent indications of gestures. Keyboard module 22 may rank the prefixes by their respective alignment scores as further described in this disclosure. Keyboard module 22 may then output character strings, words, phrases, etc., based on the prefixes. Keyboard module 22 may search or "look ahead" to determine one or more words in language model 28 that correspond respectively to a prefix. For instance, given a character string t-r-u, keyboard module 22 may determine, using language model 28 the probability of a character string truly. Keyboard module 22 may determine a language score based on the probability. In this way, character strings in language model 28 having higher probabilities in a given language context may have higher language scores.

In some examples, keyboard module 22 determines an alignment score for each prefix based at least in part on the respective spatial and language module scores for each respective character string. The alignment score for a character string may therefore represent the probability of the character string. Keyboard module 22 may order each character string in a group of character strings by alignment score in descending order from most probable character string to least probable character string. In some examples, keyboard module 22 may determine one or more words based on the one or more prefixes with the highest probabilities. UID 12 may output such character strings as suggested character strings in suggested character string regions 18A-18C. In other examples, one or more candidate character strings with the highest probabilities may be output at edit region 16A.

In some examples, computing device 10 may incrementally receive indications of user input that indicate an erroneous gesture input. That is, the gesture path may not align well with words in language model 28. Rather than outputting less probable words from a lexicon based on one or more incorrect keys indicated by the gesture, techniques of the present disclosure may improve word determination and/or prediction based on continuous gesture input by determining alternative hypotheses incrementally using correction data. For instance, each token as described herein may represent a word prefix for the gesture—e.g., the token "w-?" may represents the hypothesis that the gestures starts with the letter "w", though the remaining letters have not been recognized yet. A computing device implementing techniques of the disclosure may advance the token to consider the possible next letter of the word (e.g., "w-e-?", "w-i-?", etc.), in response to receiving further indications of gesture input. The computing device may compare each of the possible next letters to the gesture path to determine whether the gesture actually passes through these possible next letters.

The techniques may consider different edits or hypothesis at one or more character positions of a word prefix to generate possible word candidates. In other words, if a gesture path does not match a given word prefix (e.g., a probability of a match does not satisfy a threshold), the techniques may consider one or more alternative hypotheses that are due to a spelling/edit error in the intended word. Therefore, the techniques may, for example, allow a computing device to align a w-i-? gesture to a w-e-? word candidate, although the gesture does not pass through or even near to the letter "e". Such techniques may relax constraints on continuous gesture input that would otherwise require a gesture path to match every character of an intended word. By generating alternative hypotheses to relax such constraints for continuous gesture input, techniques of the disclosure may provide for improved word prediction and therefore an improved user experience when entering input.

For exemplary purposes, the techniques are further described in detail with reference to FIG. 1. In the example of FIG. 1, computing device 10 outputs for display graphical keyboard 16B comprising a plurality of keys. For example, keyboard module 22 may generate data that includes a representation of graphical keyboard 16B. UI module 20 may generate user interface 14 and include graphical keyboard 16B in user interface 14 based on the data representing graphical keyboard 16B. UI module 20 may send information to UID 12 that includes instructions for displaying user interface 14 at a presence-sensitive screen of UID 12. UID 12 may receive the information and cause the presence-sensitive screen of UID 12 to present user interface 14 including edit region 16A, graphical keyboard 16B, and suggested character string regions 18A-18C. Graphical keyboard 16B may include a plurality of keys.

Keyboard module 22 may incrementally determine a group of keys indicated by a gesture, as a user performs the gesture. For instance, keyboard module 22 may receive one or more indications of a gesture that are detected at UID 12. In one example, the gesture may be a continuous motion gesture that includes a motion of an input unit (e.g., a finger, pen, stylus, etc.) from a first location of UID 12 to a second location of UID 12 such that the gesture performed from the first location to the second location is detected by UID 12 throughout the performance of the gesture. For instance, such as when UID 12 includes a touch-sensitive display, the gesture may include a motion of an input unit from the first location to the second location with substantially constant contact between the input unit and UID 12. As illustrated in the example of FIG. 1, UID 12 may detect a gesture including gesture path 34 provided by a finger of a user from a location of UID 12 that displays "B" key 32C to a location of UID 12 that displays "E" key 32D along gesture path 22 such that UID 12 detects the finger throughout gesture path 34.

The gesture corresponding to gesture path 34 may include a plurality of portions. In some examples, the gesture may be divided into portions with substantially equivalent time durations. Where the gesture includes a plurality of portions, the gesture may include a final portion which may be a portion of the gesture detected prior to detecting that the gesture is complete. For instance, a portion of the gesture may be designated as the final portion where a user moves his/her finger out of proximity with UID 12 such that the finger is no longer detected by UID 12.

As illustrated, keyboard module 22 may receive one or more indications of a gesture that traverses a group of keys of the plurality of keys. In the example of FIG. 1, UI module 6 may incrementally detect the gesture having gesture path 34 at the UID 12 as the user performs the gesture by tracing gesture path 34 through or near keys of graphical keyboard 16B that correspond to one or more characters of a desired word (e.g., the characters corresponding to the word "benefit"). UI module 20 may send data that indicates gesture path 34 to gesture module 24, which in turn sends touch events to keyboard module 22. In some examples, UI module 20 incrementally sends data indicating gesture path 34 to gesture module 24 as gesture path 34 is detected by UI device 4.

Keyboard module 22 may receive the indications of the gesture and determine an alignment score that is based at least in part on a word prefix and at least one alignment point traversed by the gesture. In some examples, keyboard module 22 may determine group of alignment scores where each alignment score corresponds to a different prefix. An alignment score may represent a probability that the at least one alignment point indicates a key of the plurality of keys. Keyboard module 22 may determine the one or more tokens by determining a group of alignment points traversed by gesture path 34 and determining respective alignment scores for prefixes that each respectively include characters of keys that are in proximity to the alignment points. For instance, in response to determining a portion of gesture 34 beginning with "B" key 32C through "N" key 32E, keyboard module 22 may determine respective alignment scores for prefixes "ben," brn," "bem," "yen," etc. That is, keyboard module 22, may initially determine a prefix "b" in a token as gesture path 34 initially traverses near "B" key 32C. As gesture path 34 traverses near "E" key 32B, keyboard module 22 may "advance" the token for prefix "b" in a lexicon trie by creating tokens "br" and "be" (among other additional tokens).

An alignment point maybe a point along gesture path 34 that may correspond to a key of the plurality of keys included in graphical keyboard 16B. An alignment point may include one or more coordinates corresponding to the determined position of the alignment point. For instance, an alignment point may include Cartesian coordinates corresponding to a point on user interface 14.

In some examples, keyboard module 22 determines the group of alignment points traversed by gesture path 34 based on a plurality of features associated with gesture path 22. The plurality of features associated with gesture path 34 may include a length, speed, curvature, direction, etc., of a segment of gesture path 34. For instance, gesture module 24 may determine the length along the gesture segment from a previous alignment point and the current alignment point. For better alignments, the length will more closely approximate the straight-line distance between to two corresponding keyboard letters. In some examples, the alignment points may be compared to spatial models that correspond to keys in proximity to the alignment points. In this way, keyboard module 22 may determine higher probabilities for keys that are closer to the alignment points.

In response to receiving data that represents at least a portion of gesture path 34, gesture module 24 may determine one or more tokens as described above, each of the tokens including a single string of a plurality of predicted characters. For example, based at least in part on a portion of gesture path 34, keyboard module 22 may determine one or more tokens, each of the tokens including a single string of predicted characters indicated by the portion of gesture path 34. As described in the example above, keyboard module 22 may determine a first token as the string of predicted characters "ben" corresponding to an indication of a predicted selection of "B" key 32C, "E" key 32D and "N" key 32E. Similarly, gesture module 8 may determine a second token as the string of predicted characters "brn" corresponding to an indication of a predicted selection of "B" key 32C, "R" key 32G, and "N" key 32E. Keyboard module 22 may incrementally determine multiple such tokens based at least in part the proximity of gesture path 34 to one or more keys of graphical keyboard 16B. Each character of each token may be associated with a region of UID 12 that displays a key corresponding to the character. Keyboard module 22 may determine the one or more tokens based on observed touch points relative to the area of UI device 4 that displays the one or more keys corresponding to the one or more characters of the token.

Each of the tokens including a string of predicted characters may be a prefix of a word included in a lexicon. The lexicon may be modeled in language module 28. Keyboard module 22 may determine one or more candidate words based at least in part on the one or more tokens. A candidate word may be a word suggested to the user that is composed of a group of keys indicated by gesture path 34. As an example, as described above, keyboard module 34 may determine one or more tokens in response to receiving an indication of a portion of gesture path 34, such as a first token including the string of predicted characters "ben", a second token including the string of predicted characters "brn", a third token including the string of predicted characters "bem", or other tokens. One or more of the tokens may be a prefix of a word included in a lexicon. Keyboard module 22 may, in certain examples, incrementally determine one or more candidate words as one or more of the words included in the lexicon for which a token is a prefix.

In some examples, keyboard module 22 may determine respective alignment scores for prefixes that include characters associated with keys included in keyboard 16B. Each of the respective alignment scores may represent a probability that an alignment point indicates a key. That is, keyboard module 22 may determine an alignment store that indicates how closely gesture path 34 matches a given word modeled in language model 28. In some examples, an alignment score for a prefix in a token may be based on the character string that represents the word prefix, one or more alignment points of the gesture, and/or one or more keys. For instance, an alignment score for a word prefix may be based on the physical location of the alignment point with reference to the physical location of the key, and may be based on the probability that the word prefix, when appended with a character corresponding to the key, corresponds to a word in the lexicon.

In some examples, the respective alignment scores may be based on language model 28. For instance, the respective alignment scores may be based on the probability that a second key will be selected after a first key (e.g., the probability that the "e" key will be selected after the "b" key). As another example, the respective alignment scores may be based on the probability that a second candidate word will follow a first candidate word (e.g., the probability that the candidate word "benefit" will follow the candidate word "you"). In certain examples, the keys for which respective alignment scores are determined are selected based at least in part on language model 28. In some examples, the alignment scores are lower where there is a greater likelihood that an alignment point indicates a key. In other examples, the alignment scores are higher where there is a greater likelihood that an alignment point indicates a key.

In some examples, the user may make an error in performing a gesture to enter an intended word. For instance, as illustrated in FIG. 1, the user may perform a continuous gesture indicated by gesture path 34. Although the user intended to enter the word "benefit," the user entered a gesture as shown by gesture path 34 that corresponds to the misspelling "benefit." Rather than outputting an unintended word (e.g., "Bemidji") based on the erroneous gesture input, keyboard module 22 may determine at least one alternative hypothesis that is based at least in part on a misspelling of the candidate word "benefit" that included the prefix "ben." In other words, although the alignment score for "beni" and/or "benif" may be low, keyboard module 22 may output the intended word "benefit" using at least one alternative character (e.g., substituting "i" from the prefix with an "e"), which may be based at least in part on a misspelling of a candidate word that includes the prefix "ben."

In some examples, the alternative character may be associated with a key of the graphical that is a distance away from an alignment point that is greater than threshold distance. For instance, locations of one or more neighboring keys of the graphical keyboard may be within the threshold distance of the alignment point. The alternative character may be associated with a key that is not a neighboring key, e.g., the alternative character may be associated with a key of the graphical keyboard that is a distance away from the alignment point that is greater than a threshold distance. In other examples, the alternative character may be associated with a key that is a neighboring key, i.e., the alternative character may be associated with a key of the graphical keyboard that is a distance away from the alignment point that is less than or equal to a threshold distance.

Keyboard module 22 may use correction data 30, in some examples, to determine at least one alternative character that is based at least in part on a misspelling of a candidate word that includes a given word prefix. A misspelling may be a spelling that is incorrect. As one non-limiting example, a misspelling may be a character string comprising an incorrect spelling of a word in a vocabulary (a vocabulary that includes a body of words used in a language, may be included in a dictionary used by computing device 10 and/or modeled in language model 28). Correction data 30 may, generally, include data that indicates alternative characters and/or combinations of one or more characters. The alternative characters and/or combinations of characters may be based at least in part on misspellings of words or portions of words or multi-word phrases. For instance, correction data 30 may include data indicating a phonetic relationship between the letter "i" and "e" because phonetically the letters "i" and "e" may be erroneously interchanged, e.g., "substituted" by a misspelling of a user (e.g., the user intends to enter the word "benefit" but instead gestures b-e-n-i-f-i-t). Consequently, keyboard module 22 may determine an alternative hypothesis "bene" based on such data in response to determining the prefix "beni" is associated with a low alignment score (e.g., an alignment score that is less than a threshold).

In some examples, correction data 30 may include data that indicates positional relationship between one or more characters and/or combinations of characters. For example, correction data 30 may include data indicating a position relationship between the letter "i" and "e" because positionally, the characters "i" and "e" may be erroneously interchanged, e.g., "transposed" by a user (e.g., the user intends to enter the word "weird" but instead gestures w-i-e-r-d). Keyboard module 22 may determine an alternative hypothesis "weir" based on such data in response to determining that the prefix "wier" is associated with a low alignment score (e.g., an alignment score that is less than a threshold).

In another example, correction data 30 may include data that indicate omissions of one or more characters and/or combinations of characters. For example, correction data 30 may include data indicating an omission relationship between the character "h" and the character combination "Faren" because the character "h" may be erroneously omitted by a user (e.g., the user intends to enter the word "Farhenheit" but instead gestures F-a-r-e-n-h-e-i-t). Keyboard module 22 may determine an alternative hypothesis "Farhen" based on such data in response to determining that the prefix "Faren" is associated with a low alignment score.

In still other examples, correction data 30 may include data that indicates erroneous insertions of one or more characters and/or combinations of characters. For example, correction data 30 may include data indicating an insertion relationship between the character "e" and the character combination "uly" because the character "e" may be erroneously inserted by a user (e.g., the user intends to enter the word "truly" but instead gestures t-r-u-e-l-y). Keyboard module 22 may determine an alternatively hypothesis "truly" based on such data in response to determining that the prefix "truel" is associated with a low alignment score. Although the examples described above indicate various forms and/or types of data included in correction data 30, any other such suitable correction data indicating relationships between characters and/or combinations of characters based on one or more rules (e.g., relating to misspellings, mispronunciations, semantic errors, etc.) may be included in correction data 30.

In the example of FIG. 1, keyboard module 22 may determine that the alignment score for "beni" fails to satisfy a threshold. For instance, keyboard module 22 may determine that the alignment score for "beni" is less than the threshold. The threshold may be a value configured by an engineer and/or user of computing device 10. In other examples, keyboard module 22 may dynamically determine the threshold. In response to determining that the alignment score fails to satisfy the threshold, keyboard module 22 may determine at least one alternative character that is based at least in part on a misspelling of that includes the word prefix. For instance, in the example of FIG. 1, keyboard module 22 may determine an alternative hypothesis "bene" based on a relationship in correction data 30 that indicates "e" may be substituted for the alternative character "i" (e.g., the user may have made a phonetic substitution error of "i" for "e" in the gesture). In some examples, keyboard module 22 may create a token that includes the word prefix "bene", e.g., the alternative hypothesis, based on the substitution of "i" for "e" as indicated by correction data 30.

Keyboard module 22 may determine an alternative alignment score for the word prefix "bene" that is included in the token. Because the word "benefit" may be modeled in language model 28 and, in some examples, with a higher probability than words beginning with "beni", the alternative alignment score for word prefix "bene" may be higher than "beni". In some examples, keyboard module 22 may determine the alignment score as further describe herein without creating a token that includes the alternative hypothesis.

In response to determining that in response to determining that the alternative alignment score satisfies a threshold, keyboard module 22 may send data to UI module 20 that causes UID 12 to output for display, a candidate word based at least in part on the alternative character "e" that was substituted for "i" in the alternative hypothesis "bene." For example, keyboard module 22 may search or "look ahead" to determine one or more candidate words in language model 28 that correspond respectively to the prefix "bene". For instance, given a character string "bene", keyboard module 22 may determine, using language model 28, the respective probabilities of candidate words "benefit," "beg,"

and "benoit." Keyboard module 22 may therefore output the candidate words "benefit," "beg," and "benoit." In some examples, probabilities associated with candidate words "benefit," "beg," and "benoit" may be greater than any other candidate words given the word prefix "bene." In still other examples, respective probabilities associated with candidate words "benefit," "beg," and "benoit" may be greater than one or more thresholds. For instance, the threshold may be a value that is equal to a quantity of a first subset of word prefixes associated with one or more alignment scores that are greater than alignment scores associated word prefixes in a second subset of word prefixes.

In some examples, keyboard module 22 may apply a penalty for each and/or one or more corrections (e.g., applying one or more error correction operations), so a word with many spelling corrections would have a lower alignment score. That is, as keyboard module 22 generates an alternative word prefix and/or determines an alternative alignment score, keyboard module 22 may apply a penalty value to the alignment score associated with a word prefix to which keyboard module 22 applied one or more error correction operations. Furthermore, to improve performance, keyboard module 22 may limit the number of spelling corrections allowed for a single word, or limit the frequency of spelling corrections relative to the number of letters (e.g., at most 1 correction every N letters) as further described in FIG. 8.

In some examples of applying a penalty, keyboard module 22 may, in response to determining at least one alternative character that is based at least in part on a misspelling that includes at least a portion of the word prefix (e.g., applying an error correction operation), may determine a penalty value. The penalty value may be a value set by a user and/or engineer or determined dynamically as further describe herein. Keyboard module 22 may determine an alternative alignment score based at least in part on the at least one alternative character. In such examples, keyboard module 22 may determine the alternative alignment score based at least in part on the penalty value. For instance, keyboard module 22 may add the penalty value to the alternative alignment score or generate a new alternative alignment score that is the product of the alignment score and the penalty value. In this way, keyboard module 22 may apply a penalty value to an alternative alignment score. Further details of the techniques of the disclosure are described in examples of FIGS. 2-9.

Figure 2:
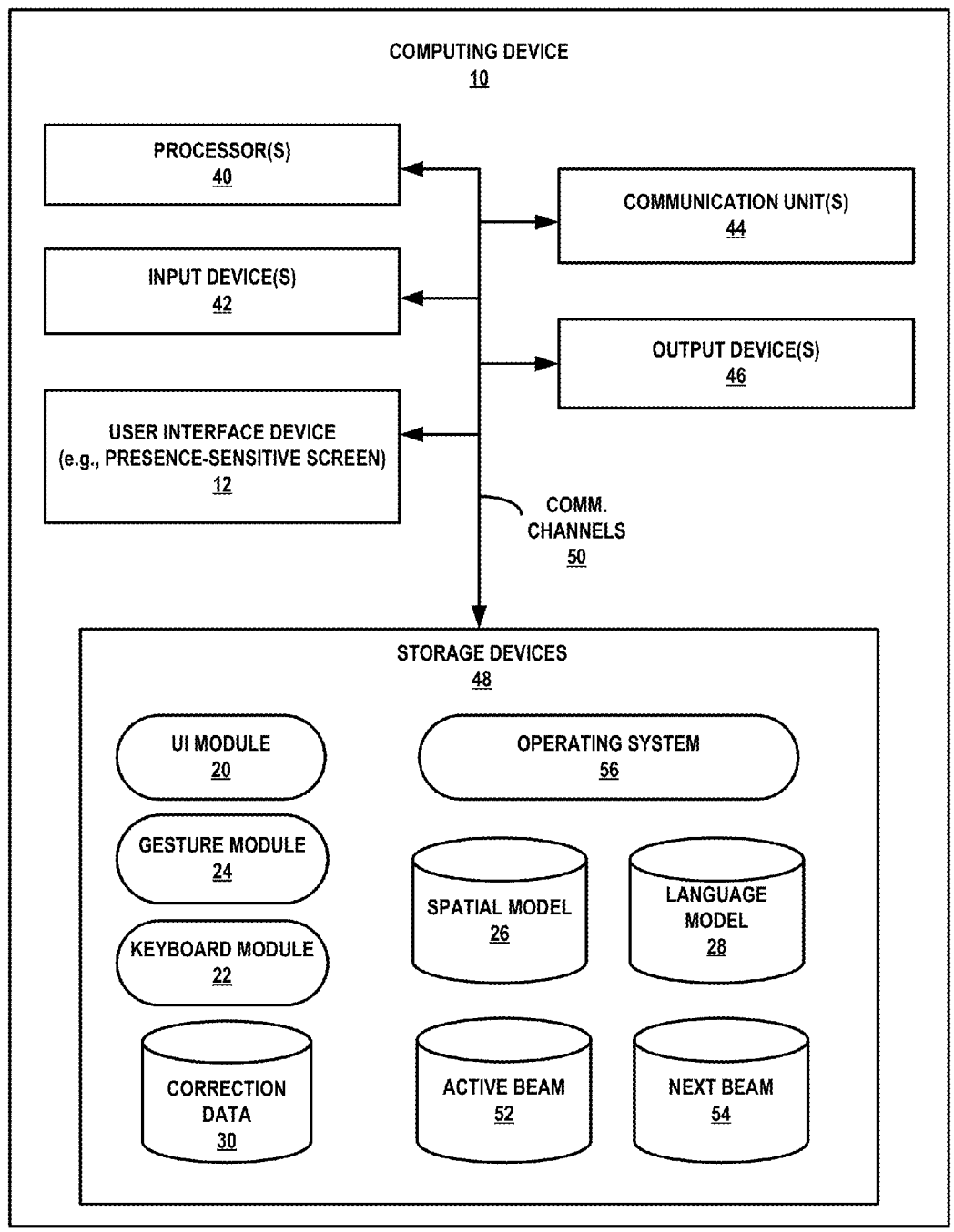
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user-interface device 12 (e.g., a presence-sensitive display), one or more processors 40, one or more input devices 42, one or more communication units 44, one or more output devices 46, and one or more storage devices 48. Storage devices 48 of computing device 10 also include UI module 20, keyboard module 22, gesture module 24, spatial model 26, language module 28, correction data 30, active beam 52, and next beam 54. Communication channels 50 may interconnect each of the components 12, 40, 42, 44, 46, 48, 20, 22, 24, 26, 28, 30, 52, 54, and 56 for inter-component communications (physically, communicatively, and/or operatively). In some examples, communication channels 50 may include a system bus, a network connection, an inter-process communication data structure, or any other construct for communicating data.

One or more input devices 42 of computing device 10 may receive input. Examples of input are tactile, audio, and video input. Input devices 42 of computing device 10, in one example, includes a mouse, keyboard, voice responsive system, video camera, microphone or any other type of device for detecting input from a human or machine. In some examples, input device 42 may be a presence-sensitive input device, which may include presence-sensitive screen, touch-sensitive screen, etc.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating visual output.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may be or may include a presence-sensitive input device, such as a presence-sensitive screen, touch-sensitive screen, etc. In some examples, a presence sensitive screen may detect an object at and/or near the presence-sensitive screen. As one example range, UID 12 may detect an object, such as a finger or stylus that is within 2 inches or less of the presence-sensitive screen. The presence-sensitive screen may determine a location (e.g., an (x,y) coordinate) of the presence-sensitive screen at which the object was detected. In another example range, a presence-sensitive screen may detect an object 6 inches or less from the presence-sensitive screen and other ranges are also possible. The presence-sensitive screen may determine the location of the screen selected by a user's finger using capacitive, inductive, and/or optical recognition techniques. In some examples, UID 12 provides output to a user using tactile, audio, or video stimuli as described with respect to output device 46. In the example of FIG. 2, UID 12 presents a user interface, such as user interface 14 of FIG. 1.

While illustrated as an internal component of computing device 10, UID 12 may also represent an external component that shares a data path with other components of computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 may be an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10. In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, keyboard module 22, gesture module 24, spatial model 26, language module 28, correction data 30, active beam 52, next beam 54, and operating system 56.

One or more processors 40 may implement functionality and/or execute instructions within computing device 10. For example, processors 40 on computing device 10 may receive and execute instructions stored by storage devices 48 that execute the functionality of UI module 20, keyboard module 22, gesture module 24, spatial model 26, language module 28, correction data 30, active beam 52, next beam 54, and operating system 56. These instructions executed by processors 40 may cause computing device 10 to store information, within storage devices 48 during program execution. Processors 40 may execute instructions of UI module 20, keyboard module 22, gesture module 24, spatial model 26, language module 28, correction data 30, active beam 52, next beam 54, and operating system 56 to cause UID 12 to display user interface 14. That is, modules UI module 20, keyboard module 22, gesture module 24, spatial model 26, language module 28, correction data 30, active beam 52, next beam 54, and operating system 56 may be operable by processors 40 to perform various actions, including receiving an indication of a gesture at locations of the presence-sensitive screen of UID 12 and causing UID to present user interface 14.

Computing device 2 may include operating system 56. Operating system 56, in some examples, controls the operation of components of computing device 2. For example, operating system 56, in one example, facilitates the communication of UI module 20, gesture module 24, and keyboard module 22 with processors 40, communication unit 44, storage device 48, input device 42, and output device 46.

Computing device 2 may include active beam 52. Active beam 52, in some examples, is configured to store one or more tokens generated by keyboard module 22. Active beam 52 may be included within storage devices 48. Computing device 2 may also include next beam 54. Next beam 54, in some examples, is configured to store one or more tokens generated by keyboard module 22. Next beam 56 may be included within storage devices 48. Correction data 30 in some examples, may maintain a misspelling dictionary, with one or more explicit entries comprising data that indicates that common gesture misspellings like "wierd" should be corrected to "weird".

Computing device 10 can include additional components that, for clarity, are not shown in FIG. 2. For example, computing device 10 can include a battery to provide power to the components of computing device 2. Similarly, the components of computing device 2 shown in FIG. 2 may not be necessary in every example of computing device 2. For example, in some configurations, computing device 2 may not include communication unit 44.

In accordance with techniques of the disclosure, keyboard module 22 may send data to UI module 20 that causes UID 12 to output for display, graphical keyboard 16B, which includes a plurality of keys. A user may perform a gesture at UID 12 that traverses one or more regions of graphical keyboard 16B that correspond to keys of graphical keyboard 16B. In response the gesture, UID 12 may detect a gesture path, such as gesture path 34 of FIG. 1, which may be received by UI module 20 as gesture path data. The gesture path may include one or more portions, which UID UI module 20 may determine incrementally as the user performs the gesture. Gesture module 24 may receive the gesture path data from UI module 20 and assemble one or more touch events as described in FIG. 1 that correspond to the gesture path data. In some examples, UI module 20 incrementally sends the gesture path data to gesture module 24 as gesture path 34 is detected by UID 12.

In response to receiving touch events from gesture module 24 corresponding to a portion of gesture path 34 from "B" key 32C to "E" key 32D, keyboard module 22 may create one or more tokens that include prefixes corresponding to keys traversed by gesture path 34. For example, keyboard module 22 may create a token at the entry node of a lexicon which may be included in language model 28. In some examples, language module 28 may be implemented as a trie data structure. Each movable token may represent a partial alignment between a node in the lexicon (i.e., a partial word and/or phrase) and a point along the gesture. As the token advances to child nodes in the lexicon (i.e., next letters in the word and/or next words of a phrase) the corresponding alignment point on the gesture may advance as well. As the token advances to the next letter in a word or to the next word in a phrase, techniques of the disclosure may determine how far the token needs to advance along the gesture path. For instance, techniques of the disclosure may include searching for an alignment point along the gesture that best aligns to a letter of a key.

As described in FIG. 1, a lexicon trie data structure may contain a plurality of nodes, each node may represent a letter. Keyboard module 22 may push each token into active beam 52. Gesture module 8 may create a token copy on each of the token's child nodes as keyboard module 22 incrementally receives further indications of user input along gesture path 34. For instance, in the example of FIG. 1, keyboard module 22 may create a first token copy on the child node representing the letter "B" (e.g., corresponding to a predicted key selection of "B" key 32C) and a second token copy on the child node representing the letter "V" (e.g., corresponding to a predicted key selection of "V" key 32H).

For each token copy, keyboard module 22 may determine, based on one or more features associated with the gesture path data, one or more alignment points traversed by the gesture. In the example of FIG. 1, keyboard module 22 may determine that a first alignment point is located at the start of gesture path 34. In some examples, keyboard module 22 may determine the curvature of the path at a point along the gesture path (e.g., in proximity to "E" key 32D). In such examples, keyboard module 22 may determine that the point is more likely to be an alignment point where there is a high curvature (where the gesture path changes direction abruptly at the point). In other examples, keyboard module 22 may determine a mid-segment curvature (the maximum curvature of the gesture path between two points along the gesture). In another example, keyboard module 22 may determine that a point is less likely to be the next alignment point where there is a high mid-segment curvature. In some examples, keyboard module 22 may determine that a point is an alignment point based on the speed at which the gesture path was detected. In some examples, a slower rate of detection indicates that the point is an alignment point. In some examples, a high mid-segment curvature may indicate that there were corners between a first point and a second point, suggesting that the second point is less likely to be the next alignment point (i.e., a point was missed in-between). In some examples, an alignment point may be based on the maximum distance between points of a gesture segment between two or more points and an ideal line from a first key to a second key. An ideal line may be, e.g., a shortest distance path from the first key to the second key. For a better alignment the maximum distance may be small, signifying that the gesture segment does not deviate from the ideal line.

For each alignment point, gesture module 8 may determine respective alignment scores for each of at least two keys of the plurality of keys. Each of the respective alignment scores may represent a probability that the alignment point indicates a key of the plurality of keys. In the example of FIG. 1, keyboard module 22 may determine a first alignment score representing a probability that the first alignment point indicates the node representing the letter "B" and a second alignment score representing a probability that the first alignment point indicates the node representing the letter "V". In some examples, keyboard module 22 may then update the token copy (e.g., that includes "B") with the respective alignment point and/or alignment score and push the token copy in next beam 54. In the example of FIG. 1, keyboard module 22 may add the first alignment score to the first token copy (e.g., that includes "B") and the second cost value to the second token copy (e.g., that includes "V").

Keyboard module 22 may determine respective physical scores for each of the at least two keys of the plurality of keys. Each of the respective physical cost values may represent a probability that physical features of an alignment point of the group of alignment points indicate a key of the plurality of keys. For instance, keyboard module 22 may determine the respective physical scores by evaluating the Euclidian distance between an alignment point of the group of alignment points and a keyboard position of key. In other examples, keyboard module 22 may use spatial model 26 to determine the probability of a key based on the location of an alignment point corresponding to gesture path 34 and the spatial model.

Physical features of the plurality of keys may be included in key regions. For example, key regions may include, for each of the plurality of keys, a set of coordinates that correspond to a location and/or area of graphical keyboard 16B where each key is displayed. In the example of FIG. 1, keyboard module 22 may determine a first physical score based on the Euclidian distance between the first alignment point and "B" key 32C. In some examples, keyboard module 22 may determine the physical scores by comparing the Euclidian distance between a first alignment point and a second alignment point with the Euclidian distance between a first key indicated by the first alignment point and a second key which may be represented by the second alignment point.

Keyboard module 22 may determine the respective alignment scores for prefixes included in tokens by determining respective language scores for each of the at least two keys of the plurality of keys. Each of the respective language scores may represent a probability that a letter represented by a key of the plurality of keys is included in a candidate word that is based on the token. The language scores may be based on language model 28. For instance, the language scores may represent the likelihood that a given key corresponding to a letter is selected based on probable words included in language model 28. In the example of FIG. 1, keyboard module 22 may determine a language score based on an entry in language model 28 indicating a frequency that the letter "B" is the first letter in a word. As described in FIG. 1, the alignment score for the token including the word prefix "B" may be based on the spatial score and the language score for "B". For instance, keyboard module 22 may determine a product of spatial and language scores for the word prefix "B" in the first token as the alignment score.

In some examples, keyboard module 22 may also determine whether the token is at a terminal node of the lexicon. A terminal node of the lexicon may be a node that represents a complete word included in the lexicon. For instance, in the example of FIG. 1, keyboard module 22 may determine, based at least in part on an indication of a portion of gesture path 34, a token including the single string of predicted characters. In addition, the token may itself represent a complete word included in the lexicon, such as a complete word in the English language. In response to determining that the token represents a candidate word included in the lexicon, keyboard module 22 may generate a next-word token. The next-word token may indicate that a next determined key of the plurality of keys based on the gesture path is a prefix of a second word included in the lexicon.

In response to receiving an indication of a portion of the gesture to select a next key of the plurality of keys, gesture module keyboard module 22 may select a token and create a token copy on each of the token's child nodes in the lexicon. Each child node may include a predicted character indicated by the received portion of the gesture. For instance, keyboard module 22 may select a token that includes the word prefix "beni". As gesture corresponding to gesture path 34 moves to "F" key 32F as illustrated in FIG. 1, computing device 10 may create a token copy of "beni" and append the character "f" corresponding to "F" key 32F that is in proximity to the gesture, in order to create a word prefix "benif". Keyboard module 22 may create one or more additional word prefixes in token copies in a similar manner, such as word prefix "benig", "benit", etc.

As described in FIG. 1, keyboard module 22 may determine an alignment score for each token included in active beam 52. In some examples, keyboard module 10 may determine at least one alternative character that is based at least in part on a misspelling that includes at least a portion of a word prefix included in one or more of the tokens. For example, as described in FIG. 1, keyboard module 22 may generate an alternative word prefix "benef" by substituting "e" for "i" in the word prefix "benif". Keyboard module 22 may store the alternative word prefix in a new token in active beam 52 as further described in FIGS. 4-7.

In some examples, keyboard module 22 may determine an alignment score for the word prefix "benef". In some examples, keyboard module 22 may determine at least one alternative character that is based at least in part on a misspelling that includes at least a portion of the word prefix. For instance, keyboard module 22 may determine at least one alternative character that is based at least in part on a misspelling that includes at least a portion of the word prefix, in response to determining that that one or more alignment scores associated with one or more word prefixes fail to satisfy a threshold. In other examples, keyboard module 22 may determine at least one alternative character that is based at least in part on a misspelling that includes at least a portion of the word prefix, without determining whether an alignment score associated with a word prefix satisfies a threshold.

Keyboard module 22 may determine at least one alternative character that is based at least in part on a misspelling that includes at least a portion of the word prefix using one or more error correction operations that are identified by type. A first example of error correction operations may include the techniques described in FIGS. 4A-4C to perform substitution error correction, and the type of error correction operations may be "substitution error correction." A second example of error correction operations may include the techniques described in FIGS. 5A-5C to perform deletion error correction, and the type of error correction operations may be "deletion error correction." A third example of error correction operations may include the techniques described in FIGS. 6A-6C to perform insertion error correction, and the type of error correction operations may be "insertion error correction." A fourth example of error correction operations may include the techniques described in FIGS. 7A-7C to perform transposition error correction, and the type of error correction operations may be "transposition error correction." While such example error correction operations are described herein, keyboard module 22 may use other suitable, example error correction techniques to determine at least one alternative character that is based at least in part on a misspelling that includes at least a portion of the word prefix.

In some examples, keyboard module 22 may determine an alternative alignment score that is based at least in part on the alternative character. For instance, keyboard module 22 may determine an alignment score of the alternative word prefix "benef" included in the new token copy added to active beam 52. Computing device 10 may, in response to determining that the alternative alignment score satisfies a second threshold, output for display, a candidate word based at least in part on the alternative character. For instance, each of the tokens in active beam 52 may be sorted in a ranked ordering from a largest (or highest) alignment score to a smallest (or lowest) alignment score. Keyboard module 22 may determine one or more candidate words based at least in part on or more word prefixes that are associated with alignment scores that satisfy the second threshold. For instance, keyboard module 22 may determine that the word prefix associated with the largest alignment score satisfies a threshold, and therefore keyboard module 22 may output one or more candidate words based at least in part on the word prefix. In some examples, keyboard module 22 may determine that a plurality of word prefixes satisfy the second threshold and therefore output a plurality of candidate words that are based respectively on the plurality of word prefixes that satisfy the second threshold. In some examples, the alternative alignment score associated with the alternative word prefix may satisfy the threshold and therefore keyboard module 22 may output one or more candidate words based at least in part on the alternative character that may be included in an alternative word prefix. Although techniques of the disclosure are described with respect to continuous gesture input for example purposes, such techniques may also be applied to tapping input and tapping based keyboards in which a user may input characters by tapping individually on keys of a graphical keyboard.

As described in FIG. 1, keyboard module 22 may apply a penalty value to an alignment score. Keyboard module 22 may apply different penalty values to alignment scores, in some examples. For instance, keyboard module 22 may apply larger penalty values or smaller penalty values to alignment scores based on the error correction operation applied to generate alternative alignment scores. Keyboard module 22 may, for example, maintain a hierarchy and/or mapping of different penalty values. Each one or more error correction operations may be associated with a type of error correction, and keyboard module 22 may maintain a plurality of different types. Each type may be associated with a different penalty value. In some examples, different penalty values may be letter dependent and/or multi-letter dependent, such that a smaller penalty value may be applied single letter corrections while keyboard module 22 may apply larger penalty values to n-letter corrections based on the size of n. Keyboard module 22 may, in response to determining an alternative alignment score, determine a type of error correction operation from a plurality of error correction operations that keyboard module 22 used to determine the alternative alignment score. Keyboard module 22 may select the penalty value from a plurality of penalty values. Each penalty value in the plurality of penalty values may be ordered in a ranked ordering. In some examples, each penalty value is associated with at least one type of error correction operation.

As one example, common misspellings indicated in correction data 30 may be associated with a first penalty value that is less than a second penalty value. The second penalty value may be associated with phonetic substitutions (e.g., "i" substituted for "e") that is less than a third penalty value. The third penalty value may be associated with transposition errors. If keyboard module 22 performs an error correction operation that generates an alternative alignment score based on a common misspelling, keyboard module 22 may apply the first penalty value to the alternative alignment score. In another example, if keyboard module 22 performs an error correction operation that generates an alternative alignment score based on a phonetic substitution, keyboard module 22 may apply the second penalty value to the alternative alignment score. In still another example, if keyboard module 22 performs an error correction operation that generates an alternative alignment score based on a transposition, keyboard module 22 may apply the third penalty value to the alternative alignment score.

In some examples, keyboard module 22 may improve perform for the extra token expansions due to error correction operations without greatly expanding the search space by limiting these extra correction expansions to only the top N tokens in the active beam (where N is typically smaller than the regular beam size. In other words, keyboard module 22 may determine alignment scores and/or alternative word prefixes only for a subset of word prefixes in the active beam that are associated with the largest alignment scores that are each greater than alignment scores associated with word prefixes in a second a subset of the active beam. In some examples, each token that includes an alternative word prefix may include a flag or other suitable data that indicates the token includes an alternative word prefix. Keyboard module 22 may store only a threshold quantity of tokens in the active beam that include the flag or other suitable data that indications the token includes an alternative word prefix. In this way, if keyboard module 22 determines that the quantity of tokens in the active beam that include alternative word prefixes satisfies a threshold, keyboard module 22 will not generate additional alternative word prefixes (and/or tokens to include the alternative word prefixes) until one or more tokens that include alternative word prefixes are removed from the active beam.

Figure 3:
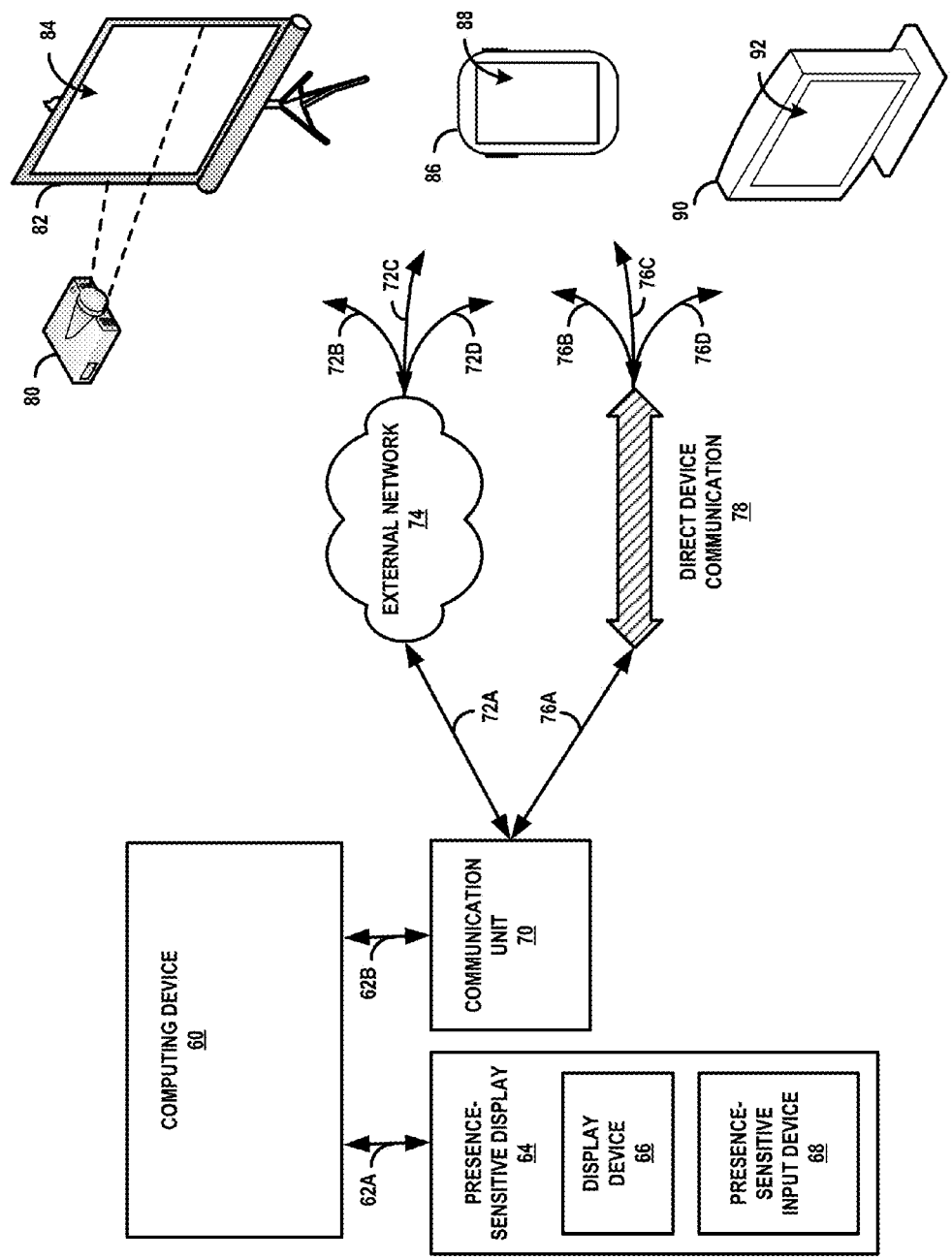
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 10, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processor 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 10 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 64, which may be a user-interface device such as UID 12 as shown in FIG. 1, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UID 12 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of UID 12 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may be operatively coupled to visual display device 90 using external network 74. Computing device 60 may output a graphical keyboard for display at presence-sensitive display 92. For instance, computing device 60 may send data that includes a representation of the graphical keyboard to communication unit 70. Communication unit 70 may send the data that includes the representation of the graphical keyboard to visual display device 90 using external network 74. Visual display device 90, in response to receiving the data using external network 74, may cause presence-sensitive display 92 to output the graphical keyboard. In response to a user performing a gesture at presence-sensitive display 92 (e.g., at a region of presence-sensitive display 92 that outputs the graphical keyboard), visual display device 90 may send an indication of the gesture to computing device 60 using external network 74. Communication unit 70 of may receive the indication of the gesture, and send the indication to computing device 60.

In response to receiving an indication of at least one gesture detected at a presence-sensitive input device, computing device 60 may determine an alignment score that is based at least in part on a word prefix and at least one alignment point traversed by the gesture. The alignment score represents a probability that the at least one alignment point indicates a key of the plurality of keys. Computing device 60 may, in response to determining that the alignment score fails to satisfy a first threshold, determine at least one alternative character that is based at least in part on a misspelling that includes at least a portion of the word prefix.

Computing device 60 may determine an alternative alignment score that is based at least in part on the alternative character. In some examples, in response to determining that the alternative alignment score satisfies a second threshold, computing device 60 may output for display, a candidate word based at least in part on the alternative character. For instance, computing device 60 may send data representing the at the candidate word to communication unit 70. Communication unit 70 may send the data to visual display device 90 via external network 74. Visual display device 90 may cause presence-sensitive display 92 to output character string represented by the data.

Figure 4A:
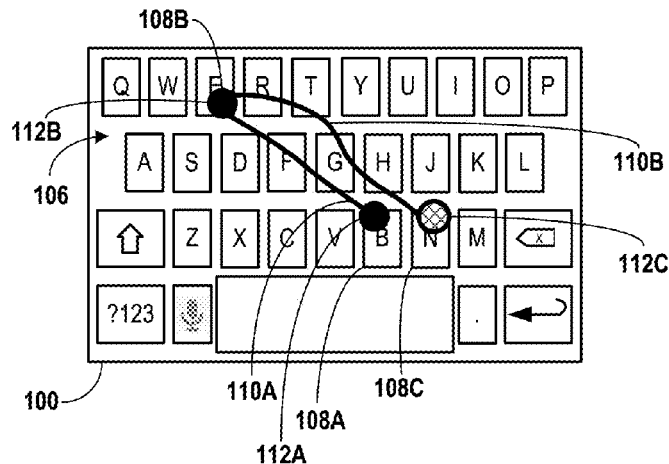
FIGS. 4A-4C are block diagrams illustrating further details of one example of a computing device shown in FIG. 1 that is used to perform substitution error correction for gesture-based input, in accordance with one or more techniques of the present disclosure.
Figure 4A:
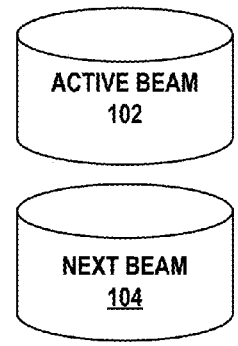
Figure 4B:
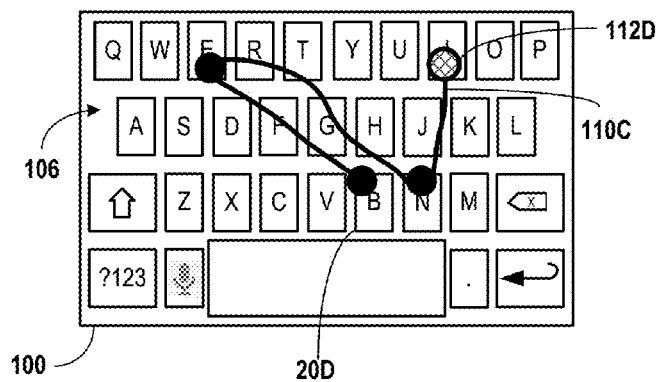
Figure 4B:
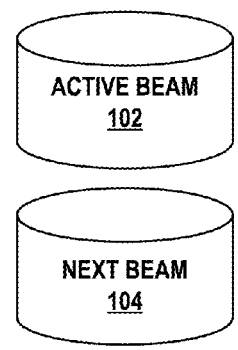
Figure 4C:
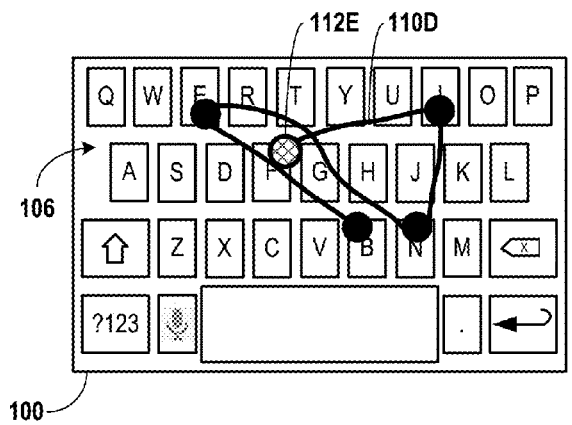
Figure 4C:
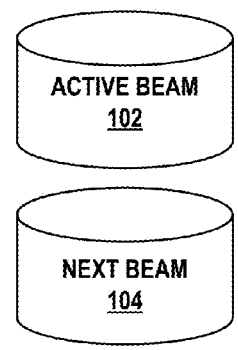

FIGS. 4A-4C are block diagrams illustrating further details of one example of a computing device shown in FIG. 1 that is used to perform substitution error correction for gesture-based input, in accordance with one or more techniques of the present disclosure. In some example techniques of the disclosure, a computing device may detect substitution errors in a continuous gesture and determine one or more alternative hypotheses to improve the accuracy of word prediction. For instance, a user may have intended to input "cemetery"; however, she may have erroneously gestured c-e-m-e-t-a-r-y. In such substitution error examples, for one or more letters in a candidate word, computing device 10 may consider two types of hypotheses. The first hypothesis is that the gesture passes through the exact letter, e.g., "cemetery." The second hypothesis is that the gesture passes through a different letter instead (e.g., a "substitution"), e.g., "cematery." In this way, although the gesture alignment score for the first hypothesis c-e-m-t-a-r-y as gestured is low, the alignment score for the second, alternative hypothesis for "cemetery" may be higher because it corresponds to a word in language model 28. The in some examples, the substitution techniques implemented by computing device 10 may provide for arbitrary substitution or, alternatively, specific substitutions based on common misspellings in the current language (e.g., in English "e" could be commonly substituted with similar sounding letters "o" or "i", but not "k"). The substitution techniques are now further described with respect to FIGS. 4A-4C.

FIGS. 4A-4C are block diagrams illustrating further details of one example of a computing device shown in FIGS. 1-3, in accordance with one or more techniques of the present disclosure. As shown in the conceptual example of FIG. 4A, computing device 10 may include GUI 100, active beam 102, and next beam 104. GUI 100 may include graphical keyboard 106 which may include "B" key 108A, "E" key 108B, and "N" key 108C. While shown in FIG. 4A, gesture path 110 that includes 110A-110B and/or alignment points 112A-112C may not be visible during the performance of the techniques described herein.

As shown in the example of FIG. 1, a user may desire to enter the word "benefit" into computing device 10 by performing a gesture at graphical keyboard 106. As previously discussed, while the user performs the gesture at a presence-sensitive input device, computing device 10 may incrementally receive indications of the gesture having a gesture path 110. In the example of FIG. 4A, computing device 10 is shown as having detected gesture path 110A-110B.

In response to detecting gesture path 110A, computing device 10 may determine alignment points 112A-112B along gesture path 110A. In response to detecting gesture path 110A, computing device 10 may create one or more tokens and push the tokens into active beam 102. A portion of example contents of active beam 102 may be represented by Table 1 below.

TABLE 1

| Index | Parent Index | Letter Key of Current Node | Letter Chain | Alignment Score |
|---|---|---|---|---|
| $i_0$ | $p_0$ | E | BE | $AS_0$ |
| $i_1$ | $p_1$ | E | VE | $AS_1$ |

In Table 1, each row represents an individual token, the index column represents a unique identifier for each token, the parent index column represents the index value of the token to which the listed token is a child, the letter key of the current node column represent the letter key represented by the current node of the token, the letter chain column represents all of the letter keys represented by the nodes from an entry node to the current node of the token, and the alignment score column represents the alignment score of the token. As shown in Table 1, the created tokens have indices of $i_0$-$i_1$ (e.g., corresponding to token$_0$-token$_1$).

To determine the text indicated by the gesture, computing device 10 may create a copy of each token on its child nodes in response to additional indications of gesture input indicating gesture path 110B. Computing device 10 may, for example, create a copy of the token with index 0 on child node "BE" (i.e., token) and child node "VE" (i.e., token$_1$). For each created token copy, computing device 10 may determine an alignment score as described in FIGS. 1-2. Computing device 10 may push each token copy to next beam 104, a portion of example contents of which may be represented by Table 2 below.

TABLE 2

| Index | Parent Index | Letter Key of Current Node | Letter Chain | Alignment Score |
|---|---|---|---|---|
| $i_3$ | $i_0$ | N | BEN | $AS_0 + AS_3$ |
| $i_4$ | $i_1$ | N | VEN | $AS_1 + AS_4$ |
| $i_5$ | $i_0$ | M | BEM | $AS_0 + AS_5$ |

The entries shown in Table 2 are similar in format to the entry shown in Table 1. In Table 2, token$_3$ has cost value $AS_0+AS_3$ and token' has cost value $AS_1+AS_4$. Computing device 10 may iterate or otherwise advance each token from active beam 102 by adding a character to each token in a similar manner and adding the updated token to next beam 104. Computing device 10 may subsequently determine whether active beam 102 is empty (i.e., contains no further tokens to be processed). In response to determining that active beam 102 is empty, computing device 10 may copy the contents of next beam 104 to active beam 102 of FIG. 4B and discard the contents of next beam 104.

In the example of FIG. 4B, computing device 10 may detect gesture path 110C. As described above, the contents of active beam 102 may be represented by Table 2. Computing device 10 may determine alignment point 112D along gesture path 110. Computing device 10 may, for each token in active beam 102, create a copy on each child node. In the example of FIG. 4B, token and token$_8$ each have child nodes with letter keys "I" and token has a child node with letter key "U." For each created token copy, computing device 10 may determine an alignment score as described in FIGS. 1-2. Computing device 10 may push each token copy in to next beam 104, a portion of example contents of which may be represented by Table 3 below.

TABLE 3

| Index | Parent Index | Letter Key of Current Node | Letter Chain | Alignment Score |
|---|---|---|---|---|
| $i_6$ | $i_4$ | I | VENI | $AS_1 + AS_4 + AS_6$ |
| $i_7$ | $i_5$ | U | BEMU | $AS_0 + AS_5 + AS_7$ |
| $i_8$ | $i_3$ | I | BENI | $AS_0 + AS_3 + AS_8$ |

The entries shown in Table 3 are similar in format to the entries shown in Table 1 and Table 2. In Table 3, the alignment score for each token includes the alignment score for the previous letters and the alignment score for the current letter. Computing device 10 may determine which, if any, of the tokens are on terminal nodes, e.g., the path of nodes from the root node to the terminal node comprising a string of characters that represent a word in language model 28. In some examples, if a token is on a terminal node, computing device 10 may select the word, e.g., to output the word for display.

In accordance with techniques of the disclosure, computing device 10 may determine that the alignment score associated with a word prefix fails to satisfy a threshold. For instance, computing device 10 may determine that the alignment score is less than the threshold. As one example, computing device 10 may determine that the alignment score for VENI, $AS_1+AS_4+AS_6$, does not satisfy a threshold. In some examples, computing device 10 may determine that a plurality of alignment scores associated with respective word prefixes fail to satisfy a threshold. For instance, computing device 10 may determine that the alignment scores for VENI, BEMU, and BENI each fail to satisfy a threshold.

In response to determining that an alignment score fails to satisfy the threshold, computing device 10 may determine at least one alternative character that is based at least in part on a misspelling that includes at least a portion of the word prefix. For instance, the word prefix "BENI" may include a first substring "BEN" and a second substring "I". That is, each substring may include zero or more characters. The second substring in this example includes at least one character "I".

Computing device 10 may determine that the second substring "I" of the word prefix "BENI" matches a first string in correction data 30. The first string may include one or more characters. In the example of FIG. 4B, computing device 10 may determine that the second substring "I" matches a first string "I" in correction data 30. Correction data 30 may include one or more relationships between strings. For instance, correction data 30 may include data indicating a relationship between the first string "I" in correction data 30 and a second string "E" in correction data 30. The second string "E" in correction data 30 may be a phonetic substitution for the first string "I" in correction data 30. Although described with respect to phonetic substitutions, any other suitable relationships between strings may be stored and retrieved in correction data 30 to perform substitutions.

Computing device 10 may determine, based at least in part on the first string in the correction data "I", the second string "E" in the correction data that comprises at least one alternative character to be included in an alternative word prefix. That is, computing device 10 may generate an alternative word prefix "BENE" that is comprised of the first substring "BEN" of the word prefix "BENI" and the second string "E" in correction data 30. In some examples, computing device 10 may concatenate "BEN" and "E" to form the alternative word prefix "BENE." Computing device 10 may store "BENE" in a new token within active beam 102. Computing device 10 may also determine an alignment score for "BENE" that is stored in the new token. Because "BENE" matches the first four characters of the word "benefit" that is modeled in language model 28, the alignment score for "BENE" may be higher than "BENI." Thus, although the user may have performed a gesture with gesture path 110C corresponding to an erroneous spelling of "benefit," computing device 10 may generate an alternative word prefix based on a misspelling of "benefit" that includes the portion of the word prefix "BEN". As illustrated further in FIG. 4C, as the user continues the gesture to spell the remaining portion of "benefit," the word prefix "BENE" will result in higher alignment scores than, for example, "BENI." A portion of example contents of active beam 102 are illustrated in Table 4.

TABLE 4

| Index | Parent Index | Letter Key of Current Node | Letter Chain | Alignment Score |
|---|---|---|---|---|
| $i_9$ | $i_3$ | E | BENE | $AS_0 + AS_3 + AS_9$ |
| $i_6$ | $i_4$ | I | VENI | $AS_1 + AS_4 + AS_6$ |
| $i_7$ | $i_5$ | U | BEMU | $AS_0 + AS_5 + AS_7$ |
| $i_8$ | $i_3$ | I | BENI | $AS_0 + AS_3 + AS_8$ |

In the example of FIG. 4C, computing device 10 is shown as having detected gesture path 110D. As described above, the contents of active beam 102 may be represented by Table 4. Computing device 10 may determine alignment point 112E along gesture path 110D. Computing device 10 may, for each token in active beam 102, create a copy on each child node. In the example of FIG. 4C, token through token each have child nodes with letter keys "F" and "G" (e.g., in proximity to and/or within a predefined distance of alignment point 112E). For each created token copy computing device 10 may determine an alignment score as described in FIGS. 1-2. Computing device 10 may push each token copy into next beam 104, the contents of which may be represented by Table 5 below.

TABLE 6

| Index | Parent Index | Letter Key of Current Node | Letter Chain | Alignment Score |
|---|---|---|---|---|
| $i_{10}$ | $i_9$ | F | BENEF | $AS_0 + AS_3 + AS_9 + AS_{10}$ |
| $i_{11}$ | $i_6$ | F | VENIF | $AS_1 + AS_4 + AS_6 + AS_{11}$ |
| $i_{12}$ | $i_7$ | F | BEMUF | $AS_0 + AS_5 + AS_7 + AS_{12}$ |
| $i_{13}$ | $i_8$ | F | BENIF | $AS_0 + AS_3 + AS_8 + AS_{13}$ |
| $i_{14}$ | $i_9$ | G | BENEG | $AS_0 + AS_3 + AS_9 + AS_{14}$ |
| $i_{15}$ | $i_6$ | G | VENIG | $AS_1 + AS_4 + AS_6 + AS_{15}$ |
| $i_{16}$ | $i_7$ | G | BEMUG | $AS_0 + AS_5 + AS_7 + AS_{16}$ |
| $i_{17}$ | $i_8$ | G | BENIG | $AS_0 + AS_3 + AS_8 + AS_{17}$ |

The entries shown in Table 6 are similar in format to the entries shown in Tables 1-5. In Table 6, the alignment score for each token includes the alignment score for the previous letters and the alignment score for the current letter. As can be seen in the example of Table 6, which may be sorted in a ranked ordering from a token with the largest alignment score to the smallest alignment score, $token_{10}$ that includes alternative word prefix "BENEF" may be associated with the largest alignment score $AS_0+AS_3+AS_9+AS_{10}$. That is, the alignment score $AS_0+AS_3+AS_9+AS_{10}$ may be the largest alignment score in Table 6. Since "BENEF" matches the first five characters of "benefit" in language model 28, computing device 10 may "look ahead" to additional nodes in language model 28, including a terminal node for "e", that collectively indicate the candidate word "benefit." In some examples, computing device 10, as further described below, may output "benefit" for display based on the word prefix "BENEF" being associated with the largest alignment score in active beam 104. Computing device 10 may continue to incrementally determine the one or more tokens as computing device 10 receives further indications of the gesture, thereby enabling a user to provide a single gesture to select a group of keys of a word or phrase.

In the example of FIG. 4C, computing device 10 may determine whether the user has completed performing the gesture. In response to determining that the user has completed performing the gesture, computing device 10 may output a list of candidate words. The candidate words may be based at least in part on the one or more tokens. In some examples, the candidate words may be modeled in language model 28 and based on the contents of one or more dictionaries that include words of a written language. In some examples, computing device 10 may determine a subset of the list of candidate words which have the highest alignment scores (i.e., the predictions with the highest probability). Additionally, in some examples, computing device 10 may, at each subsequent alignment point, revise the alignment scores of the tokens contained in active beam 102 as described in the examples of FIGS. 4A-4C.

Figure 5A:
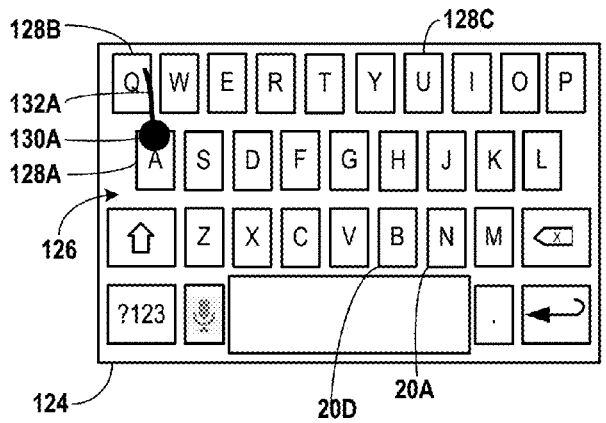
FIGS. 5A-5C are block diagrams illustrating further details of one example of a computing device shown in FIG. 1 that is used to perform deletion error correction for gesture-based input, in accordance with one or more techniques of the present disclosure.
Figure 5A:
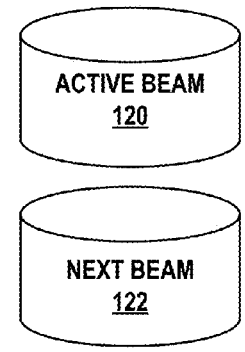
Figure 5B:
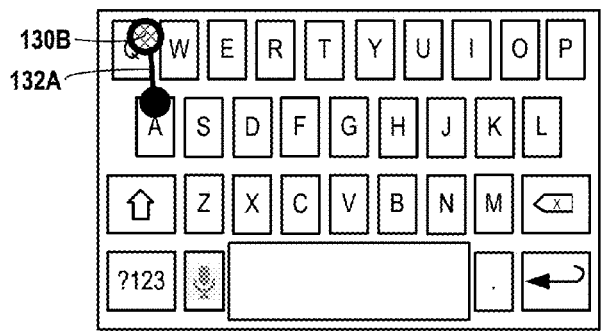
Figure 5B:
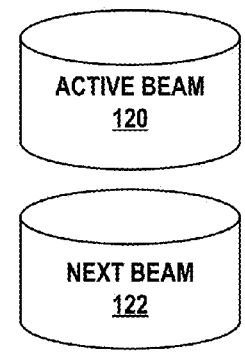
Figure 5C:
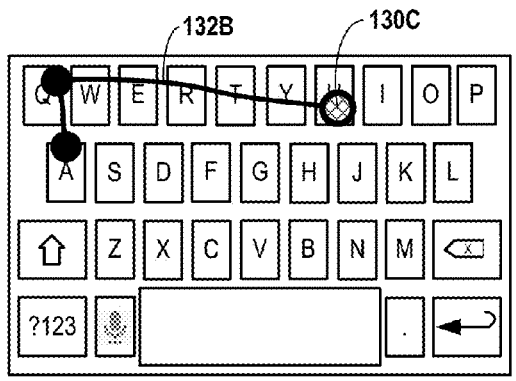
Figure 5C:
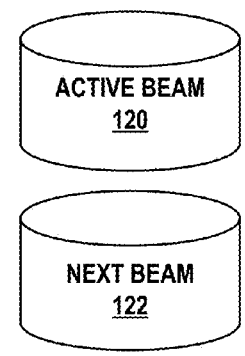

FIGS. 5A-5C are block diagrams illustrating further details of one example of a computing device shown in FIG. 1 that is used to perform deletion error correction for gesture-based input, in accordance with one or more techniques of the present disclosure. In some example techniques of the disclosure, a computing device may detect deletion errors in a continuous gesture and determine one or more alternative hypotheses to improve the accuracy of word prediction. For instance, a user may have intended to input "Fahrenheit"; however, she may have erroneously gestured f-a-r-e-n. For each letter in a candidate word, the techniques of the disclosure may also consider an alternative hypothesis the user accidentally left one or more letters out of the gesture. For instance, the user may have inadvertently omitted the key corresponding to the letter "h" in the gesture. In such examples, the techniques of the disclosure may skip the current letter and continue matching the gesture to the next letter in the word. For the "Farenheit" misspelling example, the techniques may align the first two letters "F"-"a" to the valid word "Fahrenheit." However, if "h" is not the next letter in the gesture (e.g., it has a low alignment score) the techniques of the disclosure may also consider an alternative hypothesis that the "h" is missing, and skip to the next letter "r". In this case, the previous letter that the gesture passed through is "a" so the techniques may determine that the gesture path travels from "a" to "r" (instead of the original "h" to "r"). The deletion error techniques are now further described with respect to FIGS. 5A-5C.

FIGS. 5A-5C are block diagrams illustrating further details of one example of a computing device shown in FIGS. 1-3, in accordance with one or more techniques of the present disclosure. As shown in the conceptual example of FIG. 4A, computing device 10 may include GUI 124, active beam 120, and next beam 122. GUI 124 may include graphical keyboard 126 which may include "A" key 128A, "Q" key 128B, and "U" key 128C. While shown in FIG. 5A, gesture path 132 that includes portion 132A and/or alignment point 130A may not be visible during the performance of the techniques described herein.

As shown in the example of FIG. 1, a user may desire to enter the word "acquire" into computing device 10 by performing a gesture at graphical keyboard 126. As previously discussed, while the user performs the gesture at a presence-sensitive input device, computing device 10 may incrementally receive indications of the gesture having a gesture path 132A. In the example of FIG. 5A, computing device 10 is shown as having detected gesture path 132A.

In response to detecting gesture path 132A, computing device 10 may determine alignment point 130A along gesture path 132A. Computing device 10 may create one or more tokens and push the tokens into active beam 120. The initial contents of active beam 120 may be represented by Table 1 below prior to creating one or more tokens and pushing the tokens into active beam 120 in response to indications of gesture input.

TABLE 1

| Index | Parent Index | Letter Key of Current Node | Letter Chain | Alignment Score |
|-------|--------------|---------------------------|--------------|-----------------|
| $i_0$ | — | — | — | 0 |

In Table 1, each row represents an individual token, the index column represents a unique identifier for each token, the parent index column represents the index value of the token to which the listed token is a child, the letter key of the current node column represent the letter key represented by the current node of the token, the letter chain column represents all of the letter keys represented by the nodes from an entry node to the current node of the token, and the alignment score column represents the alignment score of the token. As shown in Table 1, the created token has an index of $i_0$ (e.g., corresponding to an empty $token_0$).

To determine the text indicated by the gesture, computing device 10 may create a copy of each token on its child nodes in response to additional indications of gesture input comprising gesture path 132A. Initially, Table 1 may include an empty token (not shown) with an index of $i_0$. Computing device 10 may create a copy of the token with index $i_0$ on child node "A" (i.e., $token_0$) and child node "S" (i.e., $token_1$). For each created token copy, computing device 10 may determine an alignment score as described in FIGS. 1-2. Computing device 10 may push each token copy to next beam 122, a portion of example contents of which may be represented by Table 2 below.

TABLE 2

| Index | Parent Index | Letter Key of Current Node | Letter Chain | Alignment Score |
|-------|--------------|---------------------------|--------------|-----------------|
| $i_1$ | $i_0$ | A | A | $AS_0$ |
| $i_2$ | $i_0$ | S | S | $AS_1$ |

The entries shown in Table 2 are similar in format to the entry shown in Table 1. In Table 2, token' has cost value $AS_0$ and token has cost value $AS_1$. Therefore, a as illustrated by Table 2, computing device 10 may iterate or otherwise advance each token from active beam 120 by adding a character (e.g., "A" or "Q") to each token (e.g., the empty $token_0$) in a similar manner and adding the updated token to next beam 122. Computing device 10 may subsequently determine whether active beam 120 is empty (i.e., contains no further tokens to be processed). In response to determining that active beam 120 is empty, computing device 10 may copy the contents of next beam 122 to active beam 120 of FIG. 5B and discard the contents of next beam 120.

In the example of FIG. 5B, computing device 10 may determine alignment point 130B along gesture path 132. Computing device 10 may, for each token in active beam 120, create a copy on each child node. In the example of FIG. 5B, $token_3$ and $token_4$ each have child nodes with letter keys "Q" For each created token copy, computing device 10 may determine an alignment score as described in FIGS. 1-2. Computing device 10 may push each token copy in to next beam 122, a portion of example contents of which may be represented by Table 3 below.

TABLE 3

| Index | Parent Index | Letter Key of Current Node | Letter Chain | Alignment Score |
|---|---|---|---|---|
| $i_3$ | $i_1$ | Q | AQ | $AS_0 + AS_2$ |
| $i_4$ | $i_2$ | Q | SQ | $AS_1 + AS_3$ |

The entries shown in Table 3 are similar in format to the entries shown in Table 1 and Table 2. In Table 3, the alignment score for each token includes the alignment score for the previous letters and the alignment score for the current letter. Computing device 10 may determine which, if any, of the tokens are on terminal nodes, e.g., the path of nodes from the root node to the terminal node comprising a string of characters that represent a word in language model 28. In some examples, if a token is on a terminal node, computing device 10 may select the word, e.g., to output the word for display.

In accordance with techniques of the disclosure, computing device 10 may determine that the alignment score associated with a word prefix fails to satisfy a threshold. For instance, computing device 10 may determine that the alignment score is less than the threshold. As one example, computing device 10 may determine that the alignment score for "AQ", $AS_0+AS_2$ does not satisfy a threshold. In some examples, computing device 10 may determine that a plurality of alignment scores associated with respective word prefixes fail to satisfy a threshold. For instance, computing device 10 may determine that the alignment scores for AQ and SQ each fail to satisfy a threshold.

In response to determining that an alignment score fails to satisfy the threshold, computing device 10 may determine at least one alternative character that is based at least in part on a misspelling that includes at least a portion of the word prefix. For instance, the word prefix "AQ" may include a first substring "AQ" and a second substring " ". That is, each substring may include zero or more characters. The second substring in this example is empty.

Computing device 10 may determine that the first substring "AQ" of the word prefix "AQ" matches a first string in correction data 30. The first string may include one or more characters. In the example of FIG. 4B, computing device 10 may determine that the first substring "QC" matches a first string "AQ" in correction data 30. Correction data 30 may include one or more relationships between strings. For instance, correction data 30 may include data indicating a relationship between the first string "AQ" in correction data 30 and a second string "C" in correction data 30. In some examples, the second string may be a wildcard character "*" that may represent any character. That is, an alternative character may include a wildcard character that represents each possible character in a character set. For instance, the wildcard character "*" may represent any character {a . . . z} in the English alphabet character set.

Computing device 10 may determine, based at least in part on the first string in the correction data "AQ", the second string "*" in the correction data that comprises at least one alternative character to be included in an alternative word prefix. That is, computing device 10 may generate an alternative word prefix "ACQ" that is comprised of the first substring "AQ" of the word prefix "AQ" and the second string "C" in correction data 30. In some examples, computing device 10 may splice and/or concatenate "AQ" and "C" to form the alternative word prefix "ACQ." Correction data 30 may include data that indications the character position at which to splice and/or concatenate the word prefix "AC" and the second string "C". Computing device 10 may store "ACQ" in a new token within active beam 120. Computing device 10 may also determine an alignment score for "ACQ" that is stored in the new token. Because "ACQ" matches the first three characters of the word "acquire" that is modeled in language model 28, the alignment score for "ACQ" may be higher than "AQ." Thus, although the user may have performed a gesture with gesture path 132A corresponding to an erroneous spelling of "acquire," computing device 10 may generate an alternative word prefix based on a misspelling of "acquire" that includes the portion of the word prefix "ACQ". As illustrated further in FIG. 5C, as the user continues the gesture to spell the remaining portion of "acquire," the word prefix "ACQ" will result in higher alignment scores than, for example, "AQ." A portion of example contents of active beam 120 are illustrated in Table 4.

TABLE 4

| Index | Parent Index | Letter Key of Current Node | Letter Chain | Alignment Score |
|---|---|---|---|---|
| $i_5$ | $i_3$ | U | ACQU | $AS_0 + AS_2 + AS_4$ |
| $i_6$ | $i_3$ | U | AQU | $AS_0 + AS_2 + AS_5$ |
| $i_7$ | $i_4$ | U | SQU | $AS_1 + AS_3 + AS_6$ |
| $i_8$ | $i_3$ | I | ACQI | $AS_0 + AS_2 + AS_7$ |
| $i_9$ | $i_4$ | I | AQI | $AS_1 + AS_3 + AS_8$ |
| $i_{10}$ | $i_4$ | I | SQI | $AS_1 + AS_3 + AS_9$ |

In the example of FIG. 5C, computing device 10 is shown as having detected gesture path 132B. As described above, the contents of active beam 120 may be represented by Table 4. Computing device 10 may determine alignment point 130C along gesture path 132B. Computing device 10 may, for each token in active beam 120, create a copy on each child node. In the example of FIG. 5C, $token_5$ through $token_{10}$ each have child nodes with letter keys "U" and "I" (e.g., in proximity to and/or within a predefined distance of alignment point 130C). For each created token copy computing device 10 may determine an alignment score as described in FIGS. 1-2 and illustrated in Table 4.

The entries shown in Table 4 are similar in format to the entries shown in Tables 1-3. In Table 4, the alignment score for each token includes the alignment score for the previous letters and the alignment score for the current letter. As can be seen in the example of Table 4, which may be sorted in a ranked ordering from a token with the largest alignment score to the smallest alignment score, $token_5$ that includes alternative word prefix "ACQU" may be associated with the largest alignment score $AS_0+AS_2+AS_4$. That is, the alignment score $AS_0+AS_2+AS_4$ may be the largest alignment score in Table 4. Since "ACQU" matches the first four characters of "acquire" in language model 28, computing device 10 may "look ahead" to additional nodes in language model 28, including a terminal node for "e", that collectively indicate the candidate word "acquire." In some examples, computing device 10, as further described below, may output "acquire" for display based on the word prefix "ACQU" being associated with the largest alignment score in active beam 120. Computing device 10 may continue to incrementally determine the one or more tokens as computing device 10 receives further indications of the gesture, thereby enabling a user to provide a single gesture to select a group of keys of a word or phrase.

In the example of FIG. 5C, computing device 10 may determine whether the user has completed performing the gesture. In response to determining that the user has completed performing the gesture, computing device 10 may output a list of candidate words. The candidate words may be based at least in part on the one or more tokens. In some examples, the candidate words may be modeled in language model 28 and based on the contents of one or more dictionaries that include words of a written language. In some examples, computing device 10 may determine a subset of the list of candidate words which have the highest alignment scores (i.e., the predictions with the highest probability). Additionally, in some examples, computing device 10 may, at each subsequent alignment point, revise the alignment scores of the tokens contained in active beam 120 as described in the examples of FIGS. 5A-5C.

Figure 6A:
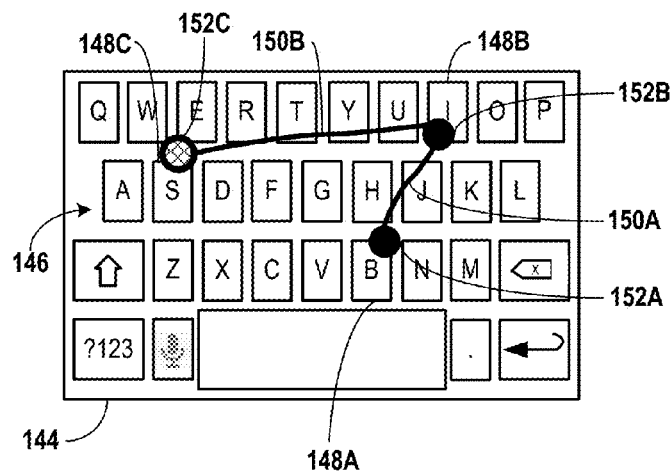
FIGS. 6A-6C are block diagrams illustrating further details of one example of a computing device shown in FIG. 1 that is used to perform insertion error correction for gesture-based input, in accordance with one or more techniques of the present disclosure.
Figure 6A:
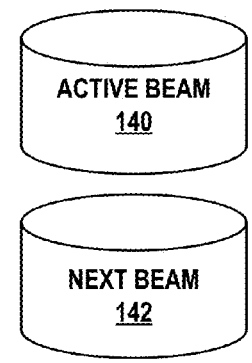
Figure 6B:
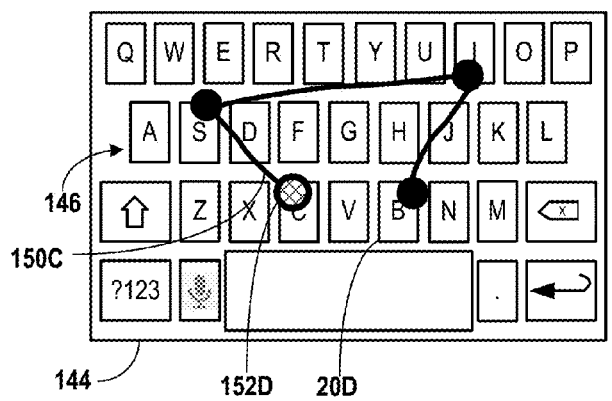
Figure 6B:
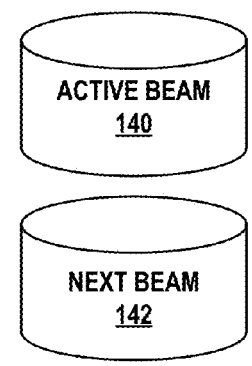
Figure 6C:
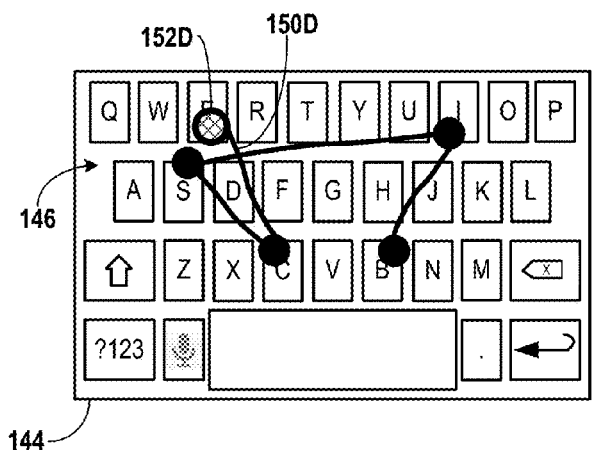
Figure 6C:
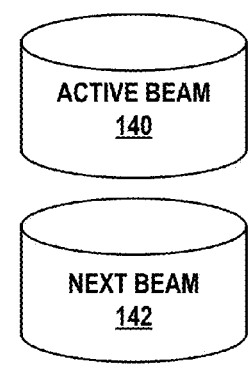

FIGS. 6A-6C are block diagrams illustrating further details of one example of a computing device shown in FIG. 1 that is used to perform insertion error correction for gesture-based input, in accordance with one or more techniques of the present disclosure. In some example techniques of the disclosure, a computing device may detect insertion errors in a continuous gesture and determine one or more alternative hypotheses to improve the accuracy of word prediction. For instance, a user may have intended to input "bicep"; however, she may have erroneously gestured b-i-s-c-e-p. In such substitution error examples, for one or more characters in a candidate word, the techniques of the disclosure may consider an alternative hypothesis that the one or more characters (e.g., the "s" in "bicep") are accidental insertions and are therefore not part of the candidate word. The techniques of the disclosure may create an alternative hypothesis that allows the gesture to travel to other arbitrary letters (e.g., "s") before returning to the next intended letter (e.g., "c"). As another example, for the misspelling of "truly" misspelling, rather than requiring that the user gesture directly from "t"-"r"-"u" to the next letter "l", the techniques of the disclosure may generate an alternative insertion hypothesis that allows the gesture to pass through another arbitrary letter (*) on the way to "l" ("t"-"r"-"u"-*-"l"). The insertion error techniques are now further described with respect to FIGS. 6A-6C.

FIGS. 6A-6C are block diagrams illustrating further details of one example of a computing device shown in FIGS. 1-3, in accordance with one or more techniques of the present disclosure. As shown in the conceptual example of FIG. 6A, computing device 10 may include GUI 144, active beam 140, and next beam 142. GUI 100 may include graphical keyboard 146 which may include "B" key 148A, "I" key 148B, and "S" key 148C. While shown in FIG. 6A, gesture path 150 that includes gesture path portions 150A-150B and/or alignment points 152A-152C may not be visible during the performance of the techniques described herein.

In the example of FIG. 6A, a user may desire to enter the word "bicep" into computing device 10 by performing a gesture at graphical keyboard 146. As previously discussed, while the user performs the gesture at a presence-sensitive input device, computing device 10 may incrementally receive indications of the gesture having a gesture path 152. In the example of FIG. 6A, computing device 10 is shown as having detected gesture path 150A-150C.

In response to detecting gesture path 150A-150B, computing device 10 may determine alignment points 152A-152C along gesture path 150A-150B. In response to detecting gesture path 150A-150B, computing device 10 may create one or more tokens and push the tokens into active beam 140. A portion of example contents of active beam 140 may be represented by Table 1 below.

TABLE 1

| Index | Parent Index | Letter Key of Current Node | Letter Chain | Alignment Score |
|---|---|---|---|---|
| $i_0$ | $p_0$ | I | BI | $AS_0$ |
| $i_1$ | $p_1$ | U | BU | $AS_1$ |

In Table 1, each row represents an individual token, the index column represents a unique identifier for each token, the parent index column represents the index value of the token to which the listed token is a child, the letter key of the current node column represent the letter key represented by the current node of the token, the letter chain column represents all of the letter keys represented by the nodes from an entry node to the current node of the token, and the alignment score column represents the alignment score of the token. As shown in Table 1, the created tokens have indices of $i_0$-$i_1$ (e.g., corresponding to $token_0$-$token_1$).

To determine the text indicated by the gesture, computing device 10 may create a copy of each token on its child nodes in response to additional indications of gesture input indicating gesture path 150B. Computing device 10 may, for example, create a copy of the token with index 0 on child node "BI" (i.e., token) and child node "BU" (i.e., $token_1$). For each created token copy, computing device 10 may determine an alignment score as described in FIGS. 1-2. Computing device 10 may push each token copy to next beam 142, a portion of example contents of which may be represented by Table 2 below.

TABLE 2

| Index | Parent Index | Letter Key of Current Node | Letter Chain | Alignment Score |
|---|---|---|---|---|
| $i_3$ | $i_0$ | S | BIS | $AS_0 + AS_3$ |
| $i_4$ | $i_1$ | S | BUS | $AS_1 + AS_4$ |
| $i_5$ | $i_0$ | D | BID | $AS_0 + AS_5$ |
| $i_6$ | $i_0$ | ~ | BI~ | $AS_0 + AS_6$ |

The entries shown in Table 2 are similar in format to the entry shown in Table 1. In Table 2, $token_3$ has cost value $AS_0+AS_3$ $token_4$ has cost value $AS_1+AS_4$ and $token_5$ has cost value $AS_0+AS_5$. Computing device 10 may iterate or otherwise advance each token from active beam 140 by adding a character to each token in a similar manner and adding the updated token to next beam 142. Computing device 10 may subsequently determine whether active beam 140 is empty (i.e., contains no further tokens to be processed). In response to determining that active beam 140 is empty, computing device 10 may copy the contents of next beam 142 to active beam 140 of FIG. 6B and discard the contents of next beam 142.

In accordance with techniques of the disclosure, computing device 10 may determine at least one alternative character that is based at least in part on a misspelling that includes at least a portion of the word prefix. For example, as illustrated in Table 2, computing device 10 may generate an alternative word prefix that includes at least a substring of the word prefix "BIS". As one example, the alternative word prefix may include the substring "BI" from the word prefix "BIS". Computing device 10 may insert a placeholder value in the substring "BI" to generate alternative word prefix "BI~". As illustrated in Table 2, the placeholder value is indicted by "~" in the alternative word prefix. A placeholder value may be data that indicates to computing device 10 at least one arbitrary character that the gesture may pass through, but that is not included in one or more candidate words that are based on the alternative word prefix. In other words, the placeholder value "~" may indicate to computing device 10 to determine candidate words in language model 28 that are based on "BI" although the gesture may indicate the user has gestured to "BIS". As will be shown further in FIGS. 6B-6C, as the gesture passes through keys c-e, computing device 10 may determine candidate words (e.g., "bicep") based on a prefix "bice" corresponding to "BI~CE", which may more accurately represent the word intended by the user than, for example, "biscep". In this way, the alternative hypothesis that includes the placeholder value "~" allows the gesture to pass through the arbitrary letter "s" on the way to "c" in the gesture bi~cep.

In an alternative example, computing device 10 may implement insertion error correction by refraining from advancing an alternative word prefix in a lexicon trie in response to one or more gestures. For instance, computing device 10 may generate an alternative word prefix that includes at least a substring of an existing word prefix. In the example of FIG. 6, computing device 10 may create a copy of word prefix "BI" selected from token$_0$. Computing device 10 may store this copy as an alternative word prefix in a new token. In response to receiving a second gesture (e.g., gesture path 150B), computing device 10 may refrain from inserting one or more characters in the alternative word prefix. That is, computing device 10 may not advance the token that includes "BI" in the lexicon trie. In this way, no additional letter, such as "S", will be appended to the alternative word prefix "BI" in response to gesture path 150B. By refraining from inserting "S" at the end of "BI", computing device 10 allows the gesture to pass through the arbitrary letter "S" (which may be a user error) on the way to "c". Computing device 10 may, in response to receiving an indication of a third gesture (e.g., 150C) that is subsequent to gesture path 150B, may insert at least one character, such as "c" in the alternative word prefix, which would then include "bic". In other words, computing device 10 may skip advancing alternative word prefix for a portion of the gesture and then continue advancing the alternative word prefix by inserting additional characters (e.g., at the end of the word prefix) as computing device 10 determines additional gesture paths (e.g., portions of a continuous gesture path).

In the example of FIG. 6B, computing device 10 may detect gesture path 150C. As described above, the contents of active beam 140 may be represented by Table 2. Computing device 10 may determine alignment point 152D along gesture path 150C. Computing device 10 may, for each token in active beam 140, create a copy on each child node. In the example of FIG. 6B shown in Table 3, token through token$_8$ each have child nodes with letter keys "C". For each created token copy, computing device 10 may determine an alignment score as described in FIGS. 1-2. Computing device 10 may push each token copy in to next beam 142, a portion of example contents of which may be represented by Table 3 below.

TABLE 3

| Index | Parent Index | Letter Key of Current Node | Letter Chain | Alignment Score |
|---|---|---|---|---|
| $i_7$ | $i_6$ | C | BI~C | $AS_1 + AS_4 + AS_7$ |
| $i_8$ | $i_3$ | C | BISC | $AS_1 + AS_4 + AS_8$ |
| $i_9$ | $i_4$ | C | BUSC | $AS_0 + AS_5 + AS_9$ |
| $i_{10}$ | $i_5$ | C | BIDC | $AS_0 + AS_3 + AS_{10}$ |

The entries shown in Table 3 are similar in format to the entries shown in Table 1 and Table 2. In Table 3, the alignment score for each token includes the alignment score for the previous letters and the alignment score for the current letter. Computing device 10 may determine which, if any, of the tokens are on terminal nodes, e.g., the path of nodes from the root node to the terminal node comprising a string of characters that represent a word in language model 28. In some examples, if a token is on a terminal node, computing device 10 may select the word, e.g., to output the word for display.

In the example of FIG. 4C, computing device 10 is shown as having detected gesture path 150D. As described above, the contents of active beam 140 may be represented by Table 3. Computing device 10 may determine alignment point 152E along gesture path 150D. Computing device 10 may, for each token in active beam 140, create a copy on each child node. In the example of FIG. 6C, token through token$_{10}$ each have child nodes with letter key "E" (e.g., in proximity to and/or within a predefined distance of alignment point 152D). For each created token copy computing device 10 may determine an alignment score as described in FIGS. 1-2. Computing device 10 may push each token copy into next beam 142, the contents of which may be represented by Table 4 below.

TABLE 4

| Index | Parent Index | Letter Key of Current Node | Letter Chain | Alignment Score |
|---|---|---|---|---|
| $i_{11}$ | $i_7$ | E | BI~CE | $AS_1 + AS_4 + AS_7 + AS_{11}$ |
| $i_{12}$ | $i_8$ | E | BISCE | $AS_1 + AS_4 + AS_8 + AS_{12}$ |
| $i_{13}$ | $i_9$ | E | BUSCE | $AS_0 + AS_5 + AS_9 + AS_{13}$ |
| $i_{14}$ | $i_{10}$ | E | BIDCE | $AS_0 + AS_3 + AS_{10} + AS_{14}$ |

The entries shown in Table 4 are similar in format to the entries shown in Tables 1-3. In Table 4, the alignment score for each token includes the alignment score for the previous letters and the alignment score for the current letter. As can be seen in the example of Table 4, which may be sorted in a ranked ordering from a token with the largest alignment score to the smallest alignment score, token$_{11}$ that includes alternative word prefix "BI~CE" may be associated with the largest alignment score $AS_1+AS_4+AS_7+AS_H$. That is, the alignment score $AS_1+AS_4+AS_7+AS_H$ may be the largest alignment score in Table 4. Since "BI~CE" corresponds to "bice" which further matches the first four characters of "bicep" in language model 28, computing device 10 may "look ahead" to additional nodes in language model 28, including a terminal node for "p", that collectively indicate the candidate word "bicep." In some examples, computing device 10, as further described below, may output "bicep" for display based on the word prefix "BI~CE" being associated with the largest alignment score in active beam 104. Computing device 10 may continue to incrementally determine the one or more tokens as computing device 10 receives further indications of the gesture, thereby enabling a user to provide a single gesture to select a group of keys of a word or phrase.

In the example of FIG. 6C, computing device 10 may determine whether the user has completed performing the gesture. In response to determining that the user has completed performing the gesture, computing device 10 may output a list of candidate words. The candidate words may be based at least in part on the one or more tokens. In some examples, the candidate words may be modeled in language model 28 and based on the contents of one or more dictionaries that include words of a written language. In some examples, computing device 10 may determine a subset of the list of candidate words which have the highest alignment scores (i.e., the predictions with the highest probability). Additionally, in some examples, computing device 10 may, at each subsequent alignment point, revise the alignment scores of the tokens contained in active beam 102 as described in the examples of FIGS. 6A-6C.

Figure 7A:
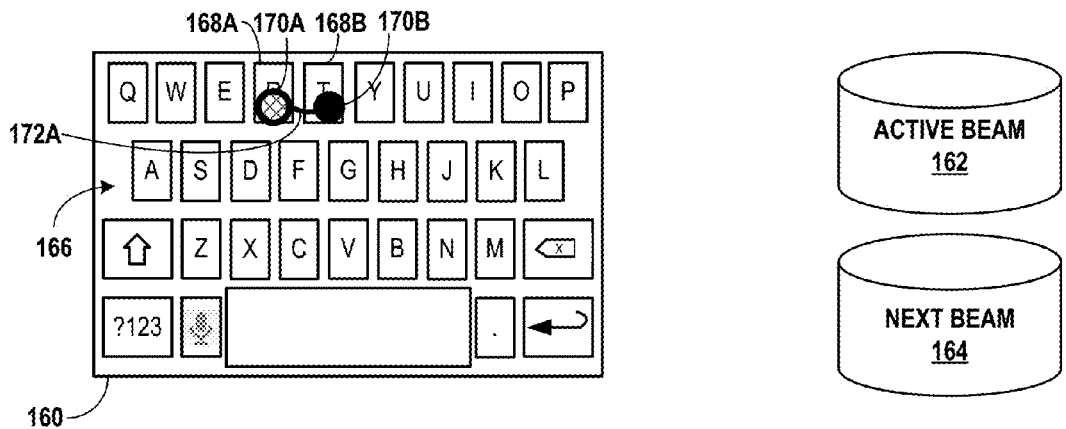
FIGS. 7A-7C are block diagrams illustrating further details of one example of a computing device shown in FIG. 1 that is used to perform transposition error correction for gesture-based input, in accordance with one or more techniques of the present disclosure.
Figure 7B:
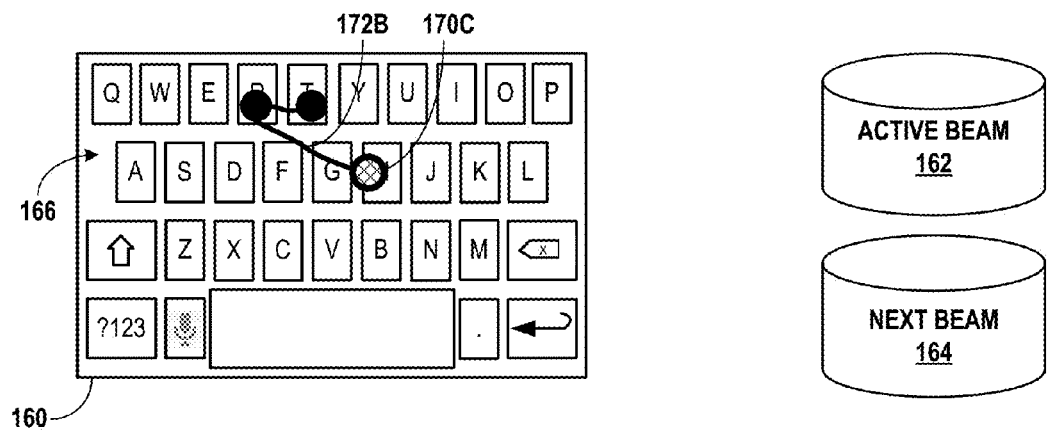
Figure 7C:
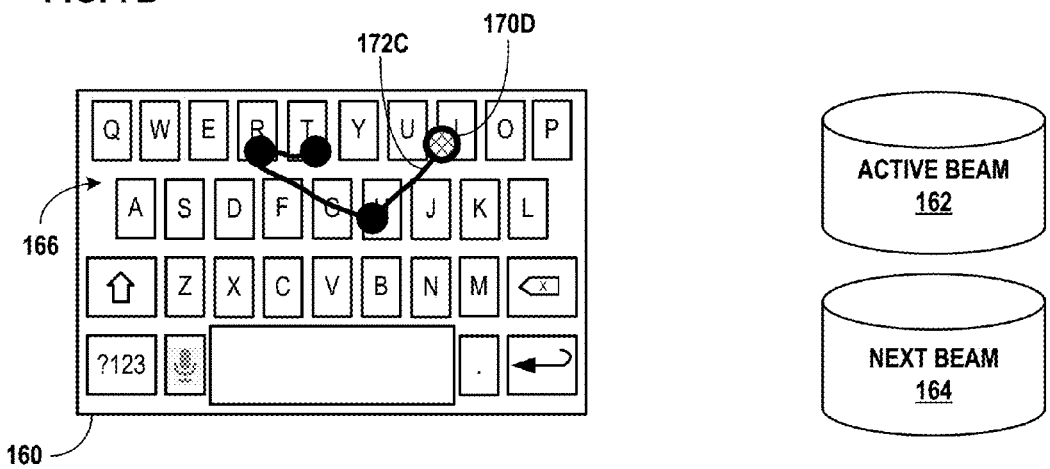

FIGS. 7A-7C are block diagrams illustrating further details of one example of a computing device shown in FIG. 1 that is used to perform transposition error correction for gesture-based input, in accordance with one or more techniques of the present disclosure. In some example techniques of the disclosure, a computing device may detect transposition errors in a continuous gesture and determine one or more alternative hypotheses to improve the accuracy of word prediction. That is, the user may perform a gesture that interchanges the position of two characters, e.g., gesturing t-r-h-i-f-t when the user intended to enter "thrift." In other words the user may have erroneously gestured the "r" key before for the "h" key. Another example may include gesturing w-i-e-r-d when the user intended to enter "weird." That is, the user may have erroneously gestured the "i" key before for the "e" key.

In such instances where a transposition error may occur, the techniques of the disclosure may, for one or more characters in a candidate word, consider an alternative hypothesis that the next two letters are transposed. For the "wierd" misspelling example, when the techniques of the disclosure compare the gesture to the dictionary word "weird", the techniques will also consider the alternative that the second and third letters are accidentally switched from "ei" to "ie". The techniques then determine whether the original "w[ei]" interpretation or the transposition-corrected "w[ie]" interpretation is the best geometric match to the gesture. Once the most probable or highest alignment scoring hypothesis is identified, the techniques continue the alignment to the next letter in the word ("r"). The transposition error techniques are now further described with respect to FIGS. 6A-6C.

FIGS. 7A-7C are block diagrams illustrating further details of one example of a computing device shown in FIGS. 1-3, in accordance with one or more techniques of the present disclosure. As shown in the conceptual example of FIG. 7C, computing device 10 may include GUI 160, active beam 162, and next beam 164. GUI 160 may include graphical keyboard 166 which may include "R" key 168A and "T" key 168B. While shown in FIG. 7A, gesture path 172 that includes gesture path portion 17A and/or alignment points 170A-170B may not be visible during the performance of the techniques described herein.

In the example of FIG. 7A, a user may desire to enter the word "thrift" into computing device 10 by performing a gesture at graphical keyboard 166. As previously discussed, while the user performs the gesture at a presence-sensitive input device, computing device 10 may incrementally receive indications of the gesture having a gesture path 172. In the example of FIG. 7A, computing device 10 is shown as having detected gesture path 172A.

In response to detecting gesture path 172A, computing device 10 may determine alignment points 170A-170B along gesture path 172A. In response to detecting gesture path 172A, computing device 10 may create one or more tokens and push the tokens into active beam 162. A portion of example contents of active beam 162 may be represented by Table 1 below.

TABLE 1

| Index | Parent Index | Letter Key of Current Node | Letter Chain | Alignment Score |
|---|---|---|---|---|
| $i_0$ | $p_0$ | T | T | $AS_0$ |
| $i_1$ | $p_1$ | G | G | $AS_1$ |

In Table 1, each row represents an individual token, the index column represents a unique identifier for each token, the parent index column represents the index value of the token to which the listed token is a child, the letter key of the current node column represent the letter key represented by the current node of the token, the letter chain column represents all of the letter keys represented by the nodes from an entry node to the current node of the token, and the alignment score column represents the alignment score of the token. As shown in Table 1, the created tokens have indices of $i_0$-$i_1$ (e.g., corresponding to $token_0$-$token_1$).

To determine the text indicated by the gesture, computing device 10 may create a copy of each token on its child nodes in response to additional indications of gesture input indicating gesture path 172A. Computing device 10 may, for example, create a copy of the token with index 0 on child node "TR" (i.e., token) and child node "GR" (i.e., $token_1$). For each created token copy, computing device 10 may determine an alignment score as described in FIGS. 1-2. Computing device 10 may push each token copy to next beam 164, a portion of example contents of which may be represented by Table 2 below.

TABLE 2

| Index | Parent Index | Letter Key of Current Node | Letter Chain | Alignment Score |
|---|---|---|---|---|
| $i_3$ | $i_0$ | R | TR | $AS_0 + AS_3$ |
| $i_4$ | $i_1$ | R | GR | $AS_1 + AS_4$ |

The entries shown in Table 2 are similar in format to the entry shown in Table 1. In Table 2, $token_3$ has cost value $AS_0+AS_3$ $token_4$ has cost value $AS_1+AS_4$. Computing device 10 may iterate or otherwise advance each token from active beam 162 by adding a character to each token in a similar manner and adding the updated token to next beam 164. Computing device 10 may subsequently determine whether active beam 162 is empty (i.e., contains no further tokens to be processed). In response to determining that active beam 162 is empty, computing device 10 may copy the contents of next beam 164 to active beam 162 of FIG. 7B and discard the contents of next beam 164.

In the example of FIG. 7B, computing device 10 may detect gesture path 172B. As described above, the contents of active beam 162 may be represented by Table 2. Computing device 10 may determine alignment point 170C along gesture path 172B. Computing device 10 may, for each token in active beam 162, create a copy on each child node. In the example of FIG. 7B shown in Table 3, token through token each have child nodes with letter keys "H". $Token_5$ each has a child node with letter keys "G". For each created token copy, computing device 10 may determine an alignment score as described in FIGS. 1-2. Computing device 10 may push each token copy in to next beam 164, a portion of example contents of which may be represented by Table 3 below.

TABLE 3

| Index | Parent Index | Letter Key of Current Node | Letter Chain | Alignment Score |
|---|---|---|---|---|
| $i_6$ | $i_3$ | H | TRH | $AS_1 + AS_4 + AS_6$ |
| $i_7$ | $i_4$ | H | GRH | $AS_0 + AS_5 + AS_7$ |
| $i_8$ | $i_3$ | G | TRG | $AS_0 + AS_3 + AS_8$ |

The entries shown in Table 3 are similar in format to the entries shown in Table 1 and Table 2. In Table 3, the alignment score for each token includes the alignment score for the previous letters and the alignment score for the current letter. Computing device 10 may determine which, if any, of the tokens are on terminal nodes, e.g., the path of nodes from the root node to the terminal node comprising a string of characters that represent a word in language model 28. In some examples, if a token is on a terminal node, computing device 10 may select the word, e.g., to output the word for display.

In accordance with techniques of the disclosure, computing device 10 may determine that the alignment score associated with a word prefix fails to satisfy a threshold. For instance, computing device 10 may determine that the alignment score is less than the threshold. As one example, computing device 10 may determine that the alignment score for "TRH," $AS_1+AS_4+AS_6$, does not satisfy a threshold. In some examples, computing device 10 may determine that a plurality of alignment scores associated with respective word prefixes fail to satisfy a threshold. For instance, computing device 10 may determine that the alignment scores for TRH, GRH, and TRG each fail to satisfy a threshold.

In response to determining that an alignment score fails to satisfy the threshold, computing device 10 may determine at least one alternative character that is based at least in part on a misspelling that includes at least a portion of the word prefix. For instance, the word prefix "TRH" may include a first substring "T" and a second substring "RH". That is, each substring may include zero or more characters. The second substring in this example includes two characters "RH".

Computing device 10 may determine a transposition of the second substring, wherein character positions of at least two characters of the second substring are transposed in the transposition. The transposition may include one or more characters of the second substring that have the character positions of the characters inverted or changed. At least one alternative character may be included in the transposition, e.g., "RH". In some examples, computing device 10 may determine that the second substring "RH" of the word prefix "TRH" matches a first string in correction data 30. The first string may include one or more characters. In the example of FIG. 7B, computing device 10 may determine that the second substring "RH" matches a first string "RH" in correction data 30. Correction data 30 may include one or more relationships between strings. For instance, correction data 30 may include data indicating a relationship between the first string "RH" in correction data 30 and a second string "HR" in correction data 30. The second string "HR" in correction data 30 may be a transposition of the first string "RH" in correction data 30. Other examples of relationships between strings may include data that specifies one or more transpositions. For instance, correction data 30 may include data that causes keyboard module 22 to transpose a substring of a word prefix. As one example, the data may cause keyboard module 22 to determine a substring of a word prefix and transpose the substring. For example, keyboard module 22 may transpose the two characters that follow a currently determined character in a word prefix. To illustrate, keyboard module 22 may determine that a token includes the character "wei" and may transpose the substring "ei" to generate an alternative word prefix "wie". In other examples, computing device 10 may automatically transpose "RH" to "HR" to generate an alternative word prefix. For example, computing device 10 may automatically invert or otherwise change the character positions of at least two characters in the word prefix to generate the alternative word prefix.

In some examples, computing device 10 may "look ahead" in a lexicon trie to determine one or more nodes in a path the trie that correspond respectively to characters. Computing device 10 may then generate a transposition of one or more of the characters corresponding to the nodes of the path. For example, computing device 10 may determine a token includes the word prefix "t". Computing device 10 may determine that the token is currently on the "t" node of a path in a lexicon trie from root→t. Computing device 10 may receive an indication of a gesture traversing the "R" key of graphical keyboard 16B, in which case computing device 10 may advance the tokens of the active beam and generate a token copy that includes the word prefix "tr". In response to receiving the indication of a gesture traversing the "T" key of graphical keyboard 16B, computing device 10 may also look ahead to one or more nodes of the lexicon trie from the node that includes "w" to determine an alternative path, such as root→t→h. In some examples, computing device 10 may determine the alternative path based on the character "r" that corresponds to the "R" key. For example, correction data 30 may indicate a relationship between "r" and "h" and/or between "tr" and "th". In any case, computing device 10 may generate a token that includes an alternative word prefix "th", which computing device 10 may include in active beam 162.

In some examples, computing device 10 may transpose multiple characters along a path in the lexicon trie to determine how well the transposed characters of the word prefix align to a gesture. For instance, computing device 10 may store a token that includes the word prefix "w". Computing device 10 may determine the next two nodes in a path of the lexicon trie include the characters "e" and "i" following node "w". Computing device 10 may generate an alternative word prefix that includes the transposition of the next two characters "ei" to generate an alternative word prefix "wie". Computing device 10 may determine an alignment score for "wie" based on the gesture path. In some examples, computing device 10 may assign the alignment score for "wie" to the token for "wei" and apply a penalty to the score for "wei".

In the example of FIG. 7B, computing device 10 may generate an alternative word prefix "THR" that is comprised of the first substring "T" of the word prefix "TRH" and the second string "HR" based on correction data 30 or otherwise automatically transposed by computing device 10 as "HR". In some examples, computing device 10 may concatenate "T" and "HR" to form the alternative word prefix "THR." Computing device 10 may store "THR" in a new token within active beam 162. Computing device 10 may also determine an alignment score for "THR" that is stored in the new token. Because "THR" matches the first three characters of the word "thrift" that is modeled in language model 28, the alignment score for "THR" may be higher than "TRH." Thus, although the user may have performed a gesture with gesture path 172A-172B corresponding to an erroneous spelling of "thrift," computing device 10 may generate an alternative word prefix based on a misspelling of "thrift" that includes the portion of the word prefix "THR". As illustrated further in FIG. 7C, as the user continues the gesture to spell the remaining portion of "thrift," the word prefix "THR" will result in higher alignment scores than, for example, "TRH." A portion of example contents of active beam 162 are illustrated in Table 4.

TABLE 4

| Index | Parent Index | Letter Key of Current Node | Letter Chain | Alignment Score |
|---|---|---|---|---|
| $i_9$ | $i_3$ | I | THR | $AS_1 + AS_4 + AS_9$ |
| $i_6$ | $i_3$ | H | TRH | $AS_1 + AS_4 + AS_6$ |
| $i_7$ | $i_4$ | H | GRH | $AS_0 + AS_5 + AS_7$ |
| $i_8$ | $i_3$ | G | TRG | $AS_0 + AS_3 + AS_8$ |

In the example of FIG. 7C, computing device 10 is shown as having detected gesture path 172C. As described above, the contents of active beam 162 may be represented by Table 4. Computing device 10 may determine alignment point 170D along gesture path 172C. Computing device 10 may, for each token in active beam 162, create a copy on each child node. In the example of FIG. 7C, token through token each have child nodes with letter keys "U" and "I" (e.g., in proximity to and/or within a predefined distance of alignment point 170D). For each created token copy computing device 10 may determine an alignment score as described in FIGS. 1-2. Computing device 10 may push each token copy into next beam 164, the contents of which may be represented by Table 5 below.

TABLE 5

| Index | Parent Index | Letter Key of Current Node | Letter Chain | Alignment Score |
|---|---|---|---|---|
| $i_{10}$ | $i_9$ | I | THRI | $AS_1 + AS_4 + AS_9 + AS_{10}$ |
| $i_{11}$ | $i_7$ | I | GRHI | $AS_0 + AS_5 + AS_7 + AS_{11}$ |
| $i_{12}$ | $i_8$ | I | TRGI | $AS_0 + AS_3 + AS_8 + AS_{12}$ |
| $i_{13}$ | $i_6$ | I | TRHI | $AS_1 + AS_4 + AS_6 + AS_{13}$ |

The entries shown in Table 5 are similar in format to the entries shown in Tables 1-4. In Table 5, the alignment score for each token includes the alignment score for the previous letters and the alignment score for the current letter. As can be seen in the example of Table 5, which may be sorted in a ranked ordering from a token with the largest alignment score to the smallest alignment score, $token_{10}$ that includes alternative word prefix "THRI" may be associated with the largest alignment score $AS_1+AS_4+AS_9+AS_{10}$. That is, the alignment score $AS_1+AS_4+AS_9+AS_{10}$ may be the largest alignment score in Table 5. Since "THRI" matches the first four characters of "thrift" in language model 28, computing device 10 may "look ahead" to additional nodes in language model 28, including a terminal node for "t", that collectively indicate the candidate word "thrift." In some examples, computing device 10, as further described below, may output "thrift" for display based on the word prefix "THRI" being associated with the largest alignment score in active beam 162. Computing device 10 may continue to incrementally determine the one or more tokens as computing device 10 receives further indications of the gesture, thereby enabling a user to provide a single gesture to select a group of keys of a word or phrase.

In the example of FIG. 7C, computing device 10 may determine whether the user has completed performing the gesture. In response to determining that the user has completed performing the gesture, computing device 10 may output a list of candidate words. The candidate words may be based at least in part on the one or more tokens. In some examples, the candidate words may be modeled in language model 28 and based on the contents of one or more dictionaries that include words of a written language. In some examples, computing device 10 may determine a subset of the list of candidate words which have the highest alignment scores (i.e., the predictions with the highest probability). Additionally, in some examples, computing device 10 may, at each subsequent alignment point, revise the alignment scores of the tokens contained in active beam 162 as described in the examples of FIGS. 7A-7C.

Figure 8:
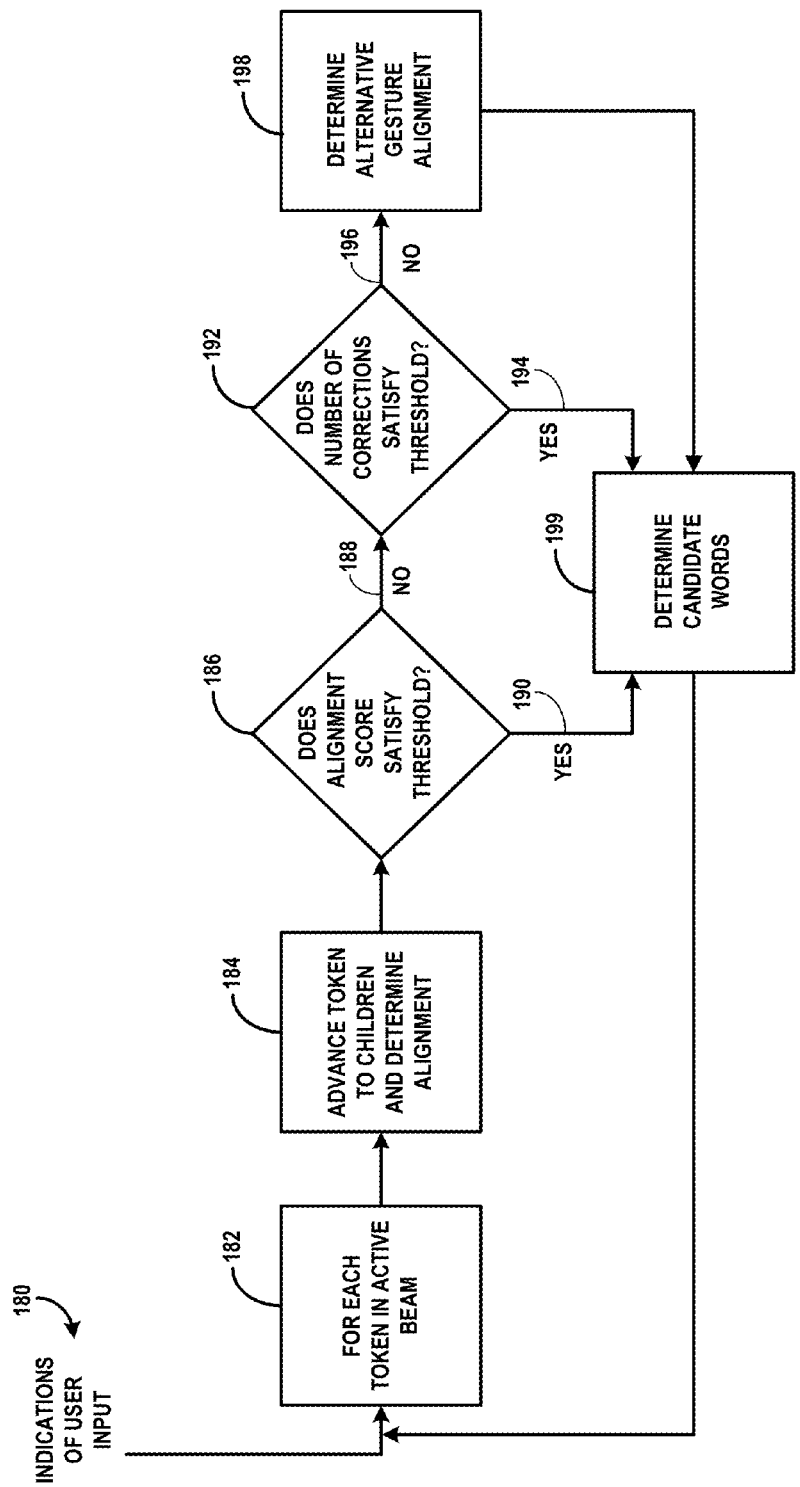
FIG. 8 is a flowchart illustrating example operations of a computing device configured to perform error correction of input using gesture-based input, in accordance with techniques of the disclosure.

FIG. 8 is a flowchart illustrating example operations of a computing device configured to perform error correction of input using gesture-based input, in accordance with techniques of the disclosure. For purposes of illustration, the example operations are described below within the context of computing device 10, as shown in FIGS. 1 and 2.

As shown in FIG. 8, computing device 10 may incrementally receive indications of user input 180 that are detected in response to a user performing a gesture (180). In response to receiving one or more indications of user input, computing device 10 may select each token in an active beam, create one or more copies of the token and advance the respective token copies to different child nodes in a lexicon trie as described in FIGS. 1-2 (184). As previously described, computing device 10 may determine whether one or more alignment scores for one or more respective tokens satisfy a threshold (186). For instance, if the respective alignment scores for one or more tokens satisfy a threshold (e.g., the alignment scores are each greater than the threshold) (190), computing device 10 may determine one or more candidate words without determining one or more alternative gesture alignments (199).

If, however, the one or more alignment scores do not satisfy the threshold (188), computing device 10 perform one or more techniques to generate alternative word prefixes. In some examples, computing device 10 store information that indicates the number of corrections applied to a word prefix. For instance, computing device 10 may determine how many error correction operations were applied to a word prefix. If, for example, computing device 10 generated a first alternative word prefix from a word prefix using a error correction operation (e.g., substitution error correction) and subsequently generated a second alternative word prefix from the first alternative word prefix using a second error correction operation (e.g., transposition error correction), computing device 10 may store information that indicates a quantity of two error correction techniques were applied to the second alternative word prefix. In some examples, the quantity of error correction techniques applied to a word prefix may be stored in the token that includes the word prefix.

As one example, computing device 10 may apply a first error correction operation to a word prefix based at least in part on a substring of the word prefix. Computing device 10 may generate an alternative word prefix when applying the first error correction operation and store information in the token that includes the word prefix that indicates a quantity of one error correction operation has been applied to generate the alternative word prefix. Responsive to receiving a subsequent indication of a gesture, computing device 10 may determine a quantity of error correction operations applied to the word prefix (192). Computing device 10 may determine that the quantity of error correction operations indicated in the token satisfies a threshold (e.g., is greater than a threshold or greater than or equal to a threshold) and refrain from applying an error correction operation to the word prefix (194). Alternatively, if the quantity of error correction operations does not satisfy a threshold (e.g., is less than the threshold) (196), then computing device 10 may determine an alternative alignment score based at least in part on an alternative character or group of characters that is based on a misspelling that includes at least a portion of the word prefix (198). In some examples, computing device 10 may determine one or more candidate words based on the alternative alignment score. In this way, as computing device 10 performs corrections and/or generates alternative alignment scores and/or alternative word prefixes, computing device 10 may determine the quantity of error correction operations (e.g., different techniques) that have been applied to a generate an alternative word prefix. If a threshold number of operations have been applied by computing device 10 to generate an alternative word prefix, computing device 10 can refrain from generating additional alternative word prefixes.

In some examples, computing device 10 may determine whether a word prefix has a degree of similarity to a word modeled in language model 28, and if the degree of similarity does not satisfy a threshold, computing device 10 may refrain from applying one or more error correction operations to the word prefix. In this way, computing device 10 may avoid performing unnecessary processing on word prefixes that are more dissimilar from one or more words in language model 28 than the threshold. As an example, computing device 10, may determine at least one alternative character that is based at least in part on a misspelling that includes at least a portion of the word prefix by applying a first error correction operation based at least in part on a substring of the word prefix. Responsive to receiving a subsequent indication of a gesture detected at a presence-sensitive input device, computing device 10 may determine a degree of similarity between the word prefix and at least one candidate word in lexicon (e.g., as modeled in language model 28. The degree of similarity may be included within a range of degrees of similarity. Computing device 10 may, responsive to determining that the degree of similarity does not satisfy a threshold (e.g., is less than the threshold), refrain from applying an error correction operation to the word prefix. If, however, the degree of similarity does satisfy the threshold (e.g., is greater than or equal to the threshold), computing device 10 may apply one or more error correction operations to the word prefix.

Figure 9:
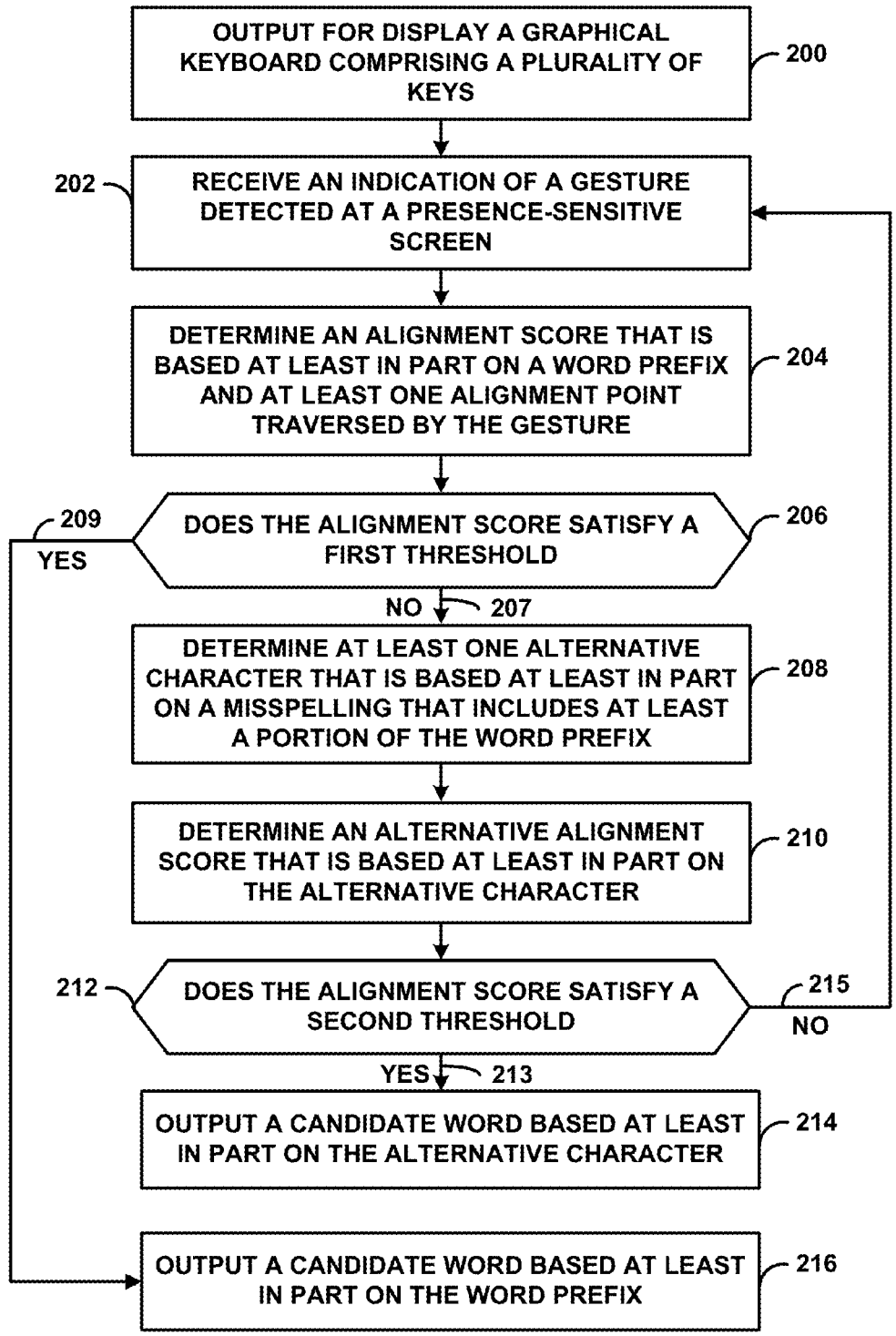
FIG. 9 is a flowchart illustrating example operations of a computing device configured to perform error correction of input using gesture-based input, in accordance with techniques of the disclosure.

FIG. 9 is a flowchart illustrating example operations of a computing device configured to perform error correction of input using gesture-based input, in accordance with techniques of the disclosure. For purposes of illustration, the example operations are described below within the context of computing device 10, as shown in FIGS. 1 and 2.

In the example of FIG. 9, computing device 10 may initially output for display, a graphical keyboard comprising a plurality of keys (200). Computing device 10 may further receive an indication of a gesture detected at a presence-sensitive input device (202). For instance, computing device 10 may receive one or more indications of a continuous gesture input performed by a user at a presence-sensitive input device. In some examples, computing device 10 may determine an alignment score that is based at least in part on a word prefix and at least one alignment point traversed by the gesture (204). In some examples, the alignment score represents a probability that the at least one alignment point indicates a key of the plurality of keys.

Computing device 10, in some examples, may determine whether the alignment score satisfies a first threshold (206). If the alignment score satisfies the threshold (209), computing device 10 may output one or more candidate words based at least in part on the word prefix (216). If, however, the alignment score does not satisfy a first threshold, computing device 10 may determine at least one alternative character that is based at least in part on a misspelling that includes at least a portion of the word prefix (208).

In some examples, computing device 10 may determine an alternative alignment score that is based at least in part on the alternative character (210). In some examples, computing device 10 may output for display, based at least in part on the alternative alignment score, a candidate word. For instance, computing device 10 may determine whether the alignment score satisfies a second threshold (212). If the alignment score does satisfy a second threshold (213), computing device 10 may output one or more candidate words for display at least in part on the alternative character (216). In other examples, if the alignment score does not satisfy a second threshold (215), computing device 10 may receive subsequent indications of the gesture detected at the presence-sensitive input device (202). In other words, computing device 10 may not output one or more candidate words based on the alternative character at that time.

Figure 10:
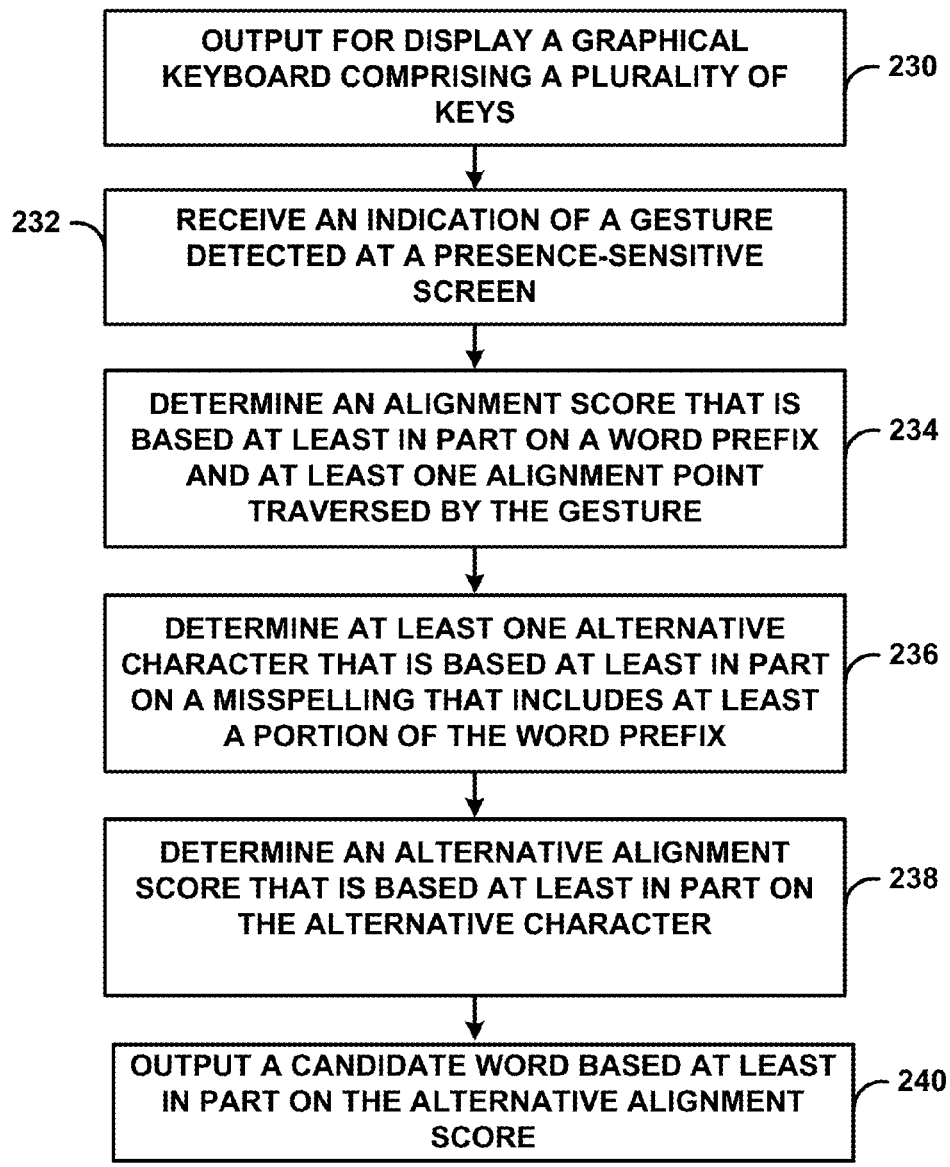
FIG. 10 is a flowchart illustrating example operations of a computing device configured to perform error correction of input using gesture-based input, in accordance with techniques of the disclosure.

FIG. 10 is a flowchart illustrating example operations of a computing device configured to perform error correction of input using gesture-based input, in accordance with techniques of the disclosure. For purposes of illustration, the example operations are described below within the context of computing device 10, as shown in FIGS. 1 and 2.

Computing device 10, in some examples, may output for display, a graphical keyboard comprising a plurality of keys (230). Computing device 10 may also receive an indication of a gesture detected at a presence-sensitive input device (232). In some examples, computing device 10 may determine an alignment score that is based at least in part on a word prefix and an alignment point traversed by the gesture, wherein the alignment score represents a probability that the alignment point indicates a key of the plurality of keys (234). Computing device 10 may determine at least one alternative character that is based at least in part on a misspelling that includes at least a portion of the word prefix (236). In some examples, computing device 10 may determine an alternative alignment score that is based at least in part on the alternative character (238). Computing device 10 may also output for display, based at least in part on the alternative alignment score, a candidate word (240).

In some examples, the operations may include determining, by the computing device, that the second substring of the word prefix matches a first string in correction data; determining, by the computing device and based at least in part on the first string in the correction data, a second string in the correction data that comprises the at least one alternative character; and generating, by the computing device, an alternative word prefix comprising the first substring of the word prefix and the second string in the correction data. In some examples, the second string in the correction data may include a phonetic substitution of the second substring in the word prefix.

In some examples, the operations may include determining, by the computing device, a substring of the word prefix that matches a first string in correction data; determining, by the computing device and based at least in part on the first string in the correction data, at least one alternative character; and generating, by the computing device, an alternative word prefix comprising the word prefix and the at least one alternative character. In some examples, the alternative character may include a wildcard character that represents each possible character in character set.

In some examples, the operations may include generating, by the computing device, an alternative word prefix comprising at least a substring of the word prefix; and inserting, by the computing device, at least one placeholder value in the alternative word prefix, wherein the at least one placeholder value indicates at least one arbitrary character that is not included in one or more candidate words that are based on the alternative word prefix. In some examples, the operations may include generating, by the computing device, an alternative word prefix comprising at least a substring of the word prefix; in response to receiving an indication of a second gesture that is subsequent to the first gesture, refraining, by the computing device, from inserting one or more characters in the alternative word prefix; and in response to receiving an indication of a third gesture that is subsequent to the second gesture, inserting, by the computing device, at least one character in the alternative word prefix.

In some examples, the operations may include generating, by the computing device, an alternative word prefix comprising at least a substring of the word prefix; in response to receiving an indication of a second gesture that is subsequent to the first gesture, refraining, by the computing device, from inserting one or more characters in the alternative word prefix; and in response to receiving an indication of a third gesture that is subsequent to the second gesture, inserting, by the computing device, at least one character in the alternative word prefix. In some examples, the operations may include determining, by the computing device, a transposition of the second substring, wherein character positions of at least two characters of the second substring are transposed in the transposition, wherein the at least one alternative character is included in the transposition; and generating, by the computing device, an alternative word prefix comprising at least the transposition.

In some examples, the operations may include determining, by the computing device, that at least one of the first substring and the second substring matches a string in correction data; and determining, by the computing device and based at least in part on the match, the transposition. In some examples, the operations may include wherein determining at least one alternative character comprises applying a first error correction operation based at least in part on a substring of the word prefix, the method, further comprising: responsive to receiving a subsequent indication of a gesture detected at a presence-sensitive input device, determining, by the computing device, a quantity of error correction operations applied to the word prefix; and responsive to determining that the quantity of error correction operations satisfies a threshold, refraining, by the computing device, from applying an error correction operation to the word prefix.

In some examples, the operations may include determining, by the computing device and in response to determining the at least one alternative character, a penalty value; and determining, by the computing device and based at least in part on the penalty value, the alternative alignment score. In some examples, the operations may include determining, by the computing device, a type of an error correction operation from a plurality of error correction operations; and selecting, by the computing device, the penalty value from a plurality of penalty values, wherein each penalty value in the plurality of penalty values is ordered in a ranked ordering, wherein each penalty value is associated with at least one type of error correction operation.

In some examples, the operations may include in response to determining that the alternative alignment score satisfies a threshold, outputting, by the computing device and for display, the candidate word based at least in part on the alternative character, wherein the threshold comprises a value that is equal to a quantity of a first subset of word prefixes associated with one or more alignment scores that are greater than alignment scores associated word prefixes in a second subset of word prefixes. In some examples, the operations may include, responsive to receiving a subsequent indication of a gesture detected at a presence-sensitive input device, determining, by the computing device, determining a degree of similarity between the word prefix and at least one candidate word in a lexicon, wherein the degree of similarity is within a range of degrees of similarity; and responsive to determining that the degree of similarity does not satisfy a threshold, refraining, by the computing device, from applying an error correction operation to the word prefix.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Various examples have been described. These and other examples are within the scope of the following claims.

What is claimed is:

1. A method comprising:
    outputting, by a computing device and for display, a graphical keyboard comprising a plurality of keys;
    responsive to detecting a first portion of a gesture at a presence-sensitive input device, generating a word prefix comprising a plurality of characters;
    responsive to detecting, by the computing device and during the gesture, a second portion of the gesture at the presence-sensitive input device:
        updating, based on a word in a dictionary, the word prefix to include an additional character;
        responsive to determining that an alignment score of the gesture matching the word prefix with the additional character does not satisfy a threshold, determining, using correction data that indicates at least one alternative word prefix that is based at least in part on a misspelling of the word in the dictionary, an alternative alignment score, wherein the alternative word prefix comprises at least a portion of the word prefix;
    determining, by the computing device and based on the alternative alignment score for the alternative word prefix, a candidate word; and
    outputting, by the computing device and for display, the candidate word.

2. The method of claim 1, further comprising:
    determining, by the computing device, that a substring of the word prefix matches a string in the correction data;
    determining, by the computing device and based at least in part on the substring of the word prefix matching the string in the correction data, at least one alternative character; and
    generating, by the computing device, the alternative word prefix comprising at least a portion of the word prefix and the at least one alternative character.

3. The method of claim 2, wherein the string in the correction data comprises a phonetic substitution of the substring of the word prefix.

4. The method of claim 2, wherein the at least one alternative character comprises a wildcard character that represents each possible character in a character set.

5. The method of claim 1, further comprising:
    generating, by the computing device, the alternative word prefix comprising at least a substring of the word prefix; and
    inserting, by the computing device, at least one placeholder value in the alternative word prefix, wherein the at least one placeholder value indicates at least one arbitrary character that is not included in the candidate word that is based on the alternative word prefix.

6. The method of claim 1, further comprising:
    determining, by the computing device, a transposition of a substring of the word prefix, wherein character positions of at least two characters of the substring are transposed in the transposition; and
    generating, by the computing device, the alternative word prefix comprising at least the transposition.

7. The method of claim 1, wherein the alternative word prefix includes an alternative character, wherein the alternative character is not based on a distance that the alignment point is away from a neighboring key that is associated with the alternative character.

8. The method of claim 1, further comprising:
    responsive to receiving a third portion of the gesture, determining, by the computing device, a quantity of error correction operations applied to the word prefix; and
    responsive to determining that the quantity of error correction operations satisfies a threshold, refraining, by the computing device, from applying a subsequent error correction operation to the word prefix.

9. The method of claim 1, further comprising:
    determining, by the computing device and responsive to determining an alternative character for the alternative word prefix, a penalty value,
    wherein determining the alternative alignment score further comprises determining, by the computing device and based at least in part on the penalty value, the alternative alignment score.

10. The method of claim 1, wherein outputting the candidate word comprises:
    responsive to determining that the alternative alignment score satisfies a threshold, outputting, by the computing device and for display, the candidate word, wherein the threshold is based on a quantity of a first subset of word prefixes associated with one or more alignment scores that are greater than alignment scores associated with word prefixes in a second subset of word prefixes.

11. A non-transitory computer-readable storage medium encoded with instructions that, when executed, cause at least one processor to:
    output, for display, a graphical keyboard comprising a plurality of keys;

in response to detecting a first portion of a gesture at a presence-sensitive input device, generate a word prefix comprising a plurality of characters;

in response to detecting, during the gesture, a second portion of the gesture at the presence-sensitive input device:

update, based on a word in a dictionary, the word prefix to include an additional character;

responsive to determining that an alignment score of the gesture matching the word prefix with the additional character does not satisfy a threshold, determine, using correction data that indicates at least one alternative word prefix that is based at least in part on a misspelling of the word in the dictionary, an alternative alignment score, wherein the alternative word prefix comprises at least a portion of the word prefix;

determine, based on the alternative alignment score for the alternative word prefix, a candidate word; and output, for display, the candidate word.

12. The non-transitory computer-readable storage medium of claim 11, comprising instructions that, when executed, cause the at least one processor of the computing device to:

determine that a substring of the word prefix matches a string in the correction data;

determine, based at least in part on the substring of the word prefix matching the string in the correction data, at least one alternative character; and generate the alternative word prefix comprising at least a portion of the word prefix and the at least one character.

13. The non-transitory computer-readable storage medium of claim 11, wherein the string in the correction data comprises a phonetic substitution of the substring of the word prefix.

14. The non-transitory computer-readable storage medium of claim 11, comprising instructions that, when executed, cause the at least one processor of the computing device to:

generate the alternative word prefix comprising at least a substring of the word prefix; and insert at least one placeholder value in the alternative word prefix, wherein the at least one placeholder value indicates at least one arbitrary character that is not included in one or more candidate words that are based on the alternative word prefix.

15. The non-transitory computer-readable storage medium of claim 11, comprising instructions that, when executed, cause the at least one processor of the computing device to:

determine a transposition of a substring of the word prefix, wherein character positions of at least two characters of the substring are transposed in the transposition; and generate the alternative word prefix comprising at least the transposition.

16. The non-transitory computer-readable storage medium of claim 11, wherein the alternative word prefix includes an alternative character, wherein the alternative character is not based on a distance that the alignment point is away from a neighboring key that is associated with the alternative character.

17. A computing device comprising:
at least one processor; and
at least one module, operable by the at least one processor to:

output, for display, a graphical keyboard comprising a plurality of keys;

generate a word prefix comprising a plurality of characters, in response to detecting a first portion of a gesture at a presence-sensitive input device;

in response to detecting, during the gesture, a second portion of the gesture at the presence-sensitive input device:

update, based on a word in a dictionary, the word prefix to include an additional character;

responsive to determining that an alignment score of the gesture matching the word prefix with the additional character does not satisfy a threshold, determine, using correction data that indicates at least one alternative word prefix that is based at least in part on a misspelling of the word in the dictionary, an alternative alignment score, wherein the alternative word prefix comprises at least a portion of the word prefix;

determine, based on the alternative alignment score for the alternative word prefix, a candidate word; and output, for display, the candidate word.

18. The computing device of claim 17, wherein the at least one module is operable by the at least one processor to:

determine that a substring of the word prefix matches a string in the correction data;

determine, based at least in part on the substring of the word prefix matching the string in the correction data, at least one alternative character; and generate the alternative word prefix comprising at least a portion of the word prefix and the at least one character.

19. The computing device of claim 17, wherein the string in the correction data comprises a phonetic substitution of the substring of the word prefix.

20. The computing device of claim 17, wherein the at least one module is operable by the at least one processor to:

generate the alternative word prefix comprising at least a substring of the word prefix; and insert at least one placeholder value in the alternative word prefix, wherein the at least one placeholder value indicates at least one arbitrary character that is not included in one or more candidate words that are based on the alternative word prefix.

21. The computing device of claim 17, wherein the at least one module is operable by the at least one processor to:

determine a transposition of a substring of the word prefix, wherein character positions of at least two characters of the substring are transposed in the transposition; and generate the alternative word prefix comprising at least the transposition.

22. The computing device of claim 17, wherein the alternative word prefix includes an alternative character, wherein the alternative character is not based on a distance that the alignment point is away from a neighboring key that is associated with the alternative character.

* * * * *